US011897157B1

(12) United States Patent
Feldman

(10) Patent No.: US 11,897,157 B1
(45) Date of Patent: Feb. 13, 2024

(54) GARLIC MINCER

(71) Applicant: Bruce Feldman, West Hartford, CT (US)

(72) Inventor: Bruce Feldman, West Hartford, CT (US)

( * ) Notice: Subject to any disclaimer, the term of this patent is extended or adjusted under 35 U.S.C. 154(b) by 0 days.

(21) Appl. No.: 18/121,829

(22) Filed: Mar. 15, 2023

(51) Int. Cl.

| | |
|---|---|
| ***B26D 3/26*** | (2006.01) |
| ***B26D 7/06*** | (2006.01) |
| ***B26D 3/18*** | (2006.01) |

(52) U.S. Cl.
CPC ............... *B26D 3/26* (2013.01); *B26D 3/185* (2013.01); *B26D 7/0608* (2013.01)

(58) Field of Classification Search
CPC .......... B26D 7/0608; B26D 3/22; B26D 3/26; B26D 3/185
See application file for complete search history.

(56) References Cited

U.S. PATENT DOCUMENTS 2,299,092 A * 10/1942 Johnson ................. B26D 3/185 83/435.16
2,341,582 A * 2/1944 Turner ..................... B26D 5/22 83/404.3
3,091,269 A * 5/1963 Burns ...................... B26D 7/22 83/431
3,664,396 A * 5/1972 Tremblay ................. B26D 3/18 425/152
4,348,950 A 9/1982 Harris
4,579,028 A * 4/1986 Neidhardt ................ B26D 3/18 83/425.3
5,419,245 A * 5/1995 Short .................... A47J 19/005 100/132
5,947,016 A * 9/1999 Repac ...................... B26D 3/18 99/545
6,053,098 A * 4/2000 Yamamoto ............... B26D 3/11 99/594
6,401,605 B1 * 6/2002 Repac ...................... B26D 3/18 99/545
7,150,214 B2 * 12/2006 Repac ..................... A47J 19/04 83/437.4

(Continued)

FOREIGN PATENT DOCUMENTS

EP 2580999 A2 4/2013

OTHER PUBLICATIONS

USB Rechargeable Electric Garlic Grinder, retrieved Feb. 16, 2023, https://www.inspiredhousehold.com/products/usb-rechargeable-electric-garlic-grinder?variant=23b17836-8df7-4337-84ef-48dd6e917dee&utm_source=google-ads&utm_campaign=pmax_hoda_home_garden&utm_agid=&utm_term=&creative=&device=c&placement=&gclid=Cj0KCQiAxbefBhDfARIsAL4XLRqp47-Pdtlwf0jKHD1-gBFXI-g-a7REN7QC9Ai64TklUZnCxjpWMvrsaAg-uEALw_wcB, 3 pages.

(Continued)

*Primary Examiner* — Sean M Michalski
(74) *Attorney, Agent, or Firm* — Brian S. Steinberger; Hilary F. Steinberger; Law Offices of Brian S. Steinberger, P.A.

(57) ABSTRACT

Devices, apparatus and methods for pressing and cutting garlic cloves in a handheld device. The device allows for positioning loose garlic cloves into a cylinder and rotating a knob to push a plunger down by a rotating screw to push the cloves through a cutting grid, and further slicing the cut pieces with a rotating blade. A quick release tab can be used to disengage the screw and allow the plunger and screw to feely travel so that the knob screw and plunger can be removed and new amounts of garlic cloves can be pressed and cut.

20 Claims, 22 Drawing Sheets

(56) References Cited

U.S. PATENT DOCUMENTS

| | | | | |
|---|---|---|---|---|
| 7,568,414 | B2 * | 8/2009 | Farid | B26D 3/26<br>83/425.3 |
| 8,596,176 | B1 * | 12/2013 | Wagner | B26D 3/185<br>99/595 |
| 10,021,904 | B1 * | 7/2018 | Fikes | A23P 30/10 |
| 2004/0103797 | A1 * | 6/2004 | Repac | A47J 19/04<br>99/495 |
| 2007/0119314 | A1 | 5/2007 | Acker, Jr. | |
| 2009/0044708 | A1 * | 2/2009 | Repac | B26D 3/185<br>99/537 |
| 2010/0095821 | A1 * | 4/2010 | Cheung | B26D 7/0608<br>83/435.19 |
| 2011/0067583 | A1 | 3/2011 | Peronti | |
| 2016/0257015 | A1 * | 9/2016 | Repac | B26D 7/0608 |
| 2018/0220828 | A1 * | 8/2018 | Conti | A47J 43/08 |
| 2019/0335954 | A1 * | 11/2019 | Chen | B26D 7/00 |
| 2021/0267417 | A1 * | 9/2021 | Quinesser | A47J 43/0705 |

OTHER PUBLICATIONS

Multifunctional Garlic Master Garlic Ginger Cutter with Silicone Garlic Peeler Plastic Grinding Tool Kitchen Ginger Grater Grinder, retrieved Feb. 16, 2023, https://www.lightinthebox.com/en/p/multifunctional-garlic-master-garlic-ginger-cutter-with-silicone-garlic-peeler-plastic-grinding-tool-kitchen-ginger-grater-grinder_p9243689.html, 11 pages.

Garlic Master Garlic Cutter—Official Website, retrieved Feb. 28, 2018, https://www.buygarlicmaster.com/, 3 pages.

* cited by examiner 1
10
20
60
40
80
90
150
120
130
140

1
10
60
80
90
150
120
130
155
140

1
10
60
90
80
155
140

GARLIC MINCER

FIELD OF INVENTION

This invention relates to mincers of crush and cut garlic and the like, and in particular to devices, apparatus and methods for pressing and cutting garlic cloves, by positioning loose garlic cloves into a cylinder and rotating a knob to push a plunger down by a rotating screw to push the cloves through a cutting grid, and further slicing the cut pieces with a rotating blade, along with a quick release tab to disengage the screw and allow the plunger and screw to feely travel so that the knob screw and plunger can be removed and new amounts of garlic cloves can be pressed and cut.

BACKGROUND AND PRIOR ART

Garlic is very desirable ingredient for most exotic dishes that are cooked. It is popular to form crushed garlic or chopped garlic. Chopped garlic has pieces usually visible in a dish, and can be formed from mincer type devices. Crushed garlic generally appears to be pasty in appearance, and can be formed from garlic presses and/or the broad side of knife being used to crush the garlic.

Various types of garlic presses and mincers have been proposed over the years. See for example, U.S. Pat. No. 4,348,950 to Harris, and European Patent Application EP 2,580,999 to Cotter et al. However, there are problems with the prior art.

For example, Harris '950 is primarily used to crush garlic through holes to extract juice (see abstract). Harris '950 does not create sliced pieces of garlic that would be helpful to be used with cooking dishes that do not rely on only garlic juice. EPO '999 to Cotter is an elaborate device with a ratcheting body pivotally mounted to a based that are squeezed together in the hand of a user to mince garlic pieces (see paragraph 003). The ratcheting device would be expensive to manufacture and assemble, and also difficult to take apart to be cleaned between uses.

Thus, the need exists for solutions to the above problems with the prior art.

SUMMARY OF THE INVENTION

A primary objective of the present invention is to provide devices, apparatus and methods for pressing and cutting garlic cloves, by positioning loose garlic cloves into a cylinder and rotating a knob to push a plunger down by a rotating screw to push the cloves through a cutting grid, and further slicing the cut pieces with a rotating blade, along with a quick release tab to disengage the screw and allow the plunger and screw to feely travel so that the knob screw and plunger can be removed and new amounts of garlic cloves can be pressed and cut.

An embodiment of the garlic presser/mincing device includes a cylinder assembly having an open upper end and a bottom end with a cutting grid, and a chamber therebetween for storing garlic cloves;

- a screw assembly having an upper end and a bottom end;
- a plunger attached to the bottom end of the screw assembly; the plunger placed over the stored garlic cloves;
- a rotating blade attached to the bottom end of the screw assembly positioned below the cutting grid; and
- a turn knob attached to the upper end of the screw assembly, wherein rotating the knob rotates the screw assembly to push the plunger down and pushes the cloves through a cutting grid into resultant garlic pieces, followed by slicing the resultant garlic pieces into sliced cube pieces with the rotating blade.

The device can include a quick release tab attached to the device to be used when the plunger has pushed all the garlic cloves through the cutting grid, to disengage the screw assembly and allow the plunger and the screw assembly to be removed for new amounts of garlic cloves be inserted into the chamber.

The device can include a removable cap attached to the bottom end of the cylinder assembly for holding the sliced cube pieces of garlic.

In the cylinder assembly, the plunger, the cutting grid and the rotating blade can be formed from stainless steel.

The cylinder assembly can include an outer cylindrical housing;

an inner cylindrical housing within the outer cylindrical housing; and an inner rectangular housing within the inner cylindrical housing, wherein the inner rectangular housing allows for the plunger to slide up and down.

The screw assembly can include an outer cylinder having an external thread surface and a turning blade rod positioned inside the outer cylinder.

The device can include an upper turning blade cover for protecting an upper portion of the turning blade rod and an external cover tube for protecting a lower portion of the turning blade rod.

The plunger can include downwardly extending teeth.

The rotating blade can include two curved blades attached to a central hub. made from stainless steel.

The knob can be formed from molded plastic and includes upper gripping edge.

In a preferred embodiment, the cutting grid and curved cutting blade are sequenced to cut garlic into small cube shapes. The inner housing cavity allows for multiple garlic cloves to be minced. Cooking grade stainless steel can be used for cutting and all components in contact with garlic.

Garlic cloves can be kept in inner housing between uses.

Plunger teeth clean cutting grid at end of cutting cycle.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1:
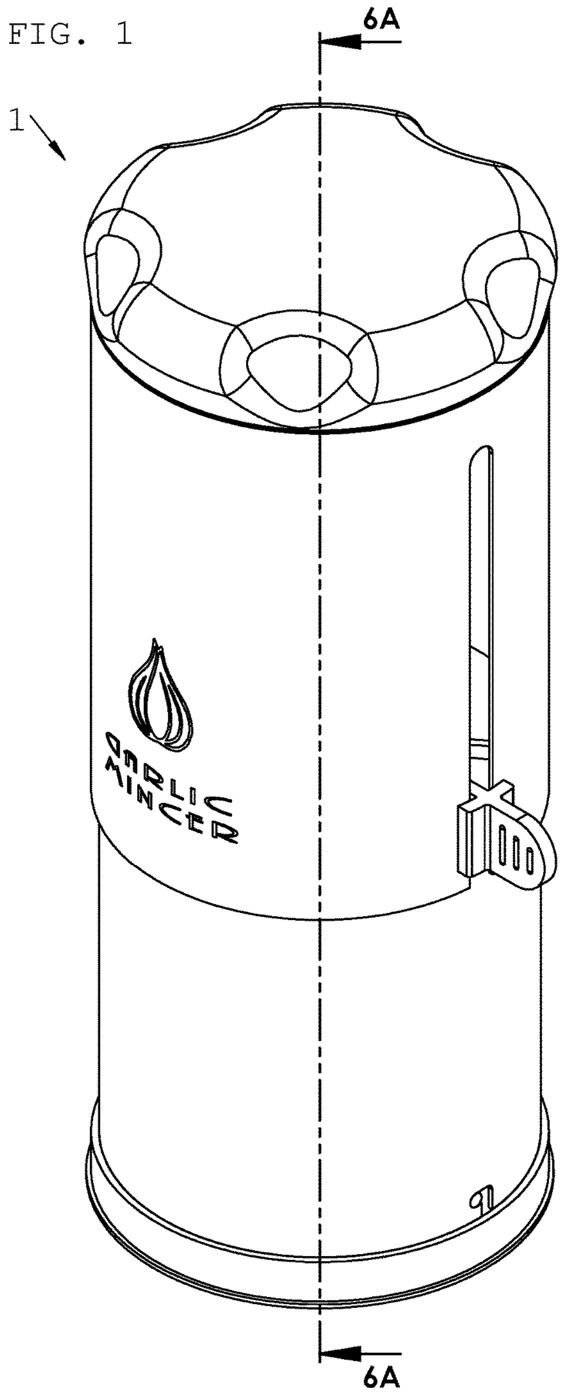
FIG. 1 is an upper front right perspective view of an assembled garlic presser/device with the interior plunger in an up position with the inner housing full of garlic cloves.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.

1 Assembled garlic presser/device
10 turn knob
11 cylindrical stem portion with external threads
12 narrow groove
13 wide groove
14 central cavity with internal threads
16 central post with protruding rectangular/square head
20 upper outer housing
21 upper end
22 narrow inwardly facing protrusion
23 wide inwardly facing protrusion
25 side slit
30 upper turning blade cover
40 quick release pull tab
42 tab end
43 stop
44 elongated leg
46 base member
47 spring members/legs
48 oval opening
49 raised arc ridge
50 lower outer housing
52 flat top lid
53 central through-hole opening
54 raised arc ridge
56 lower edge opposite facing inverted L-shape groove(s).
60 screw
62 upper external threaded end
64 large flat threaded side
66 bottom cap with central opening there-through.
70 retaining ring generally ring shape
72 side opening
73 three internal facing protruding edges.
80 plunger, rectangular shape
82 flat top
83 central opening there-through
84 rectangular side walls
85 teeth on bottom
90 inner housing
100 lower blade turning rod, square shaped
102 top end
104 bottom opposite facing pegs
106 bottom end
110 external cover tube
120 cutting grid
122 base
123 left raised prong connector
124 right raised prong connector
126 rectangular grid
127 center square through-hole
128 cylindrical sidewall

Figure 2:
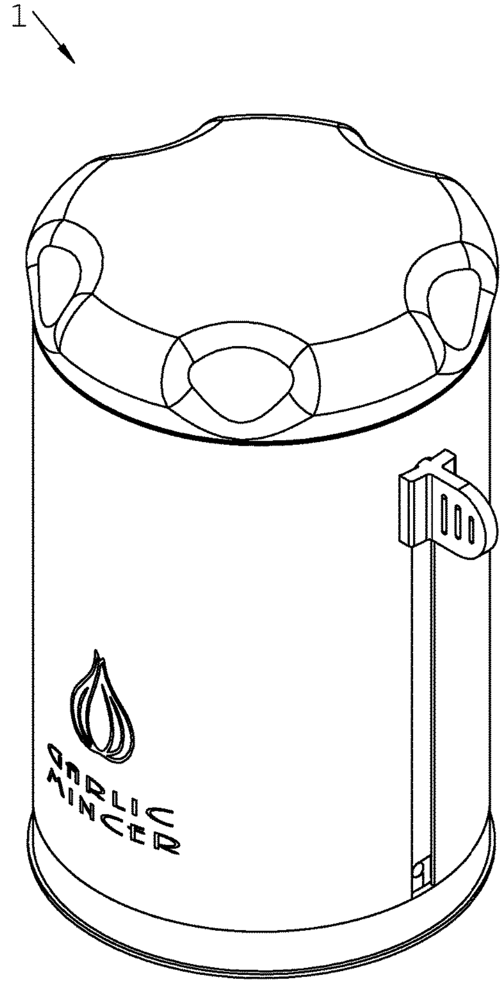
FIG. 2 is an upper front perspective view of the assembled garlic presser/device of FIG. 1 with the interior plunger in a down position and inner housing empty.

130 curved cutting blade(s)
132 left curved wing blade
134 right curved wing blade
135 center hub with internal threads
140 bottom cap
150 garlic cloves
155 cut garlic pieces FIG. 1 is an upper front right perspective view of an assembled garlic presser device 1 with the interior plunger in an up position with the inner housing full of garlic cloves. FIG. 2 is an upper front perspective view of the assembled garlic presser device 1 of FIG. 1 with the interior plunger in a down position and inner housing empty.

Figure 3B:
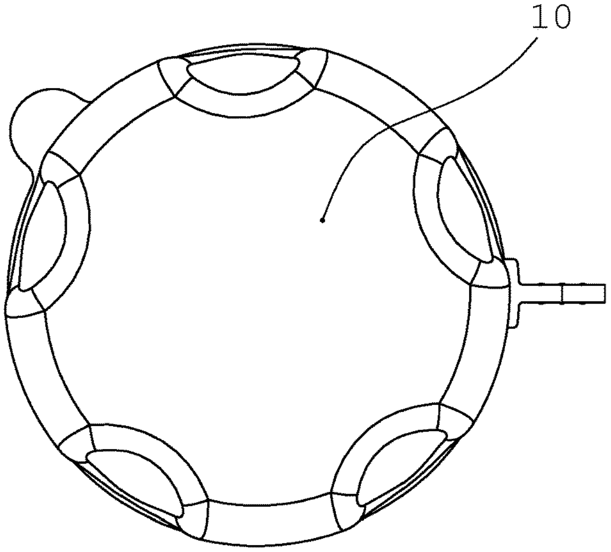
FIG. 3B is a top view of the assembled garlic presser/device of FIG. 3A.
Figure 3A:
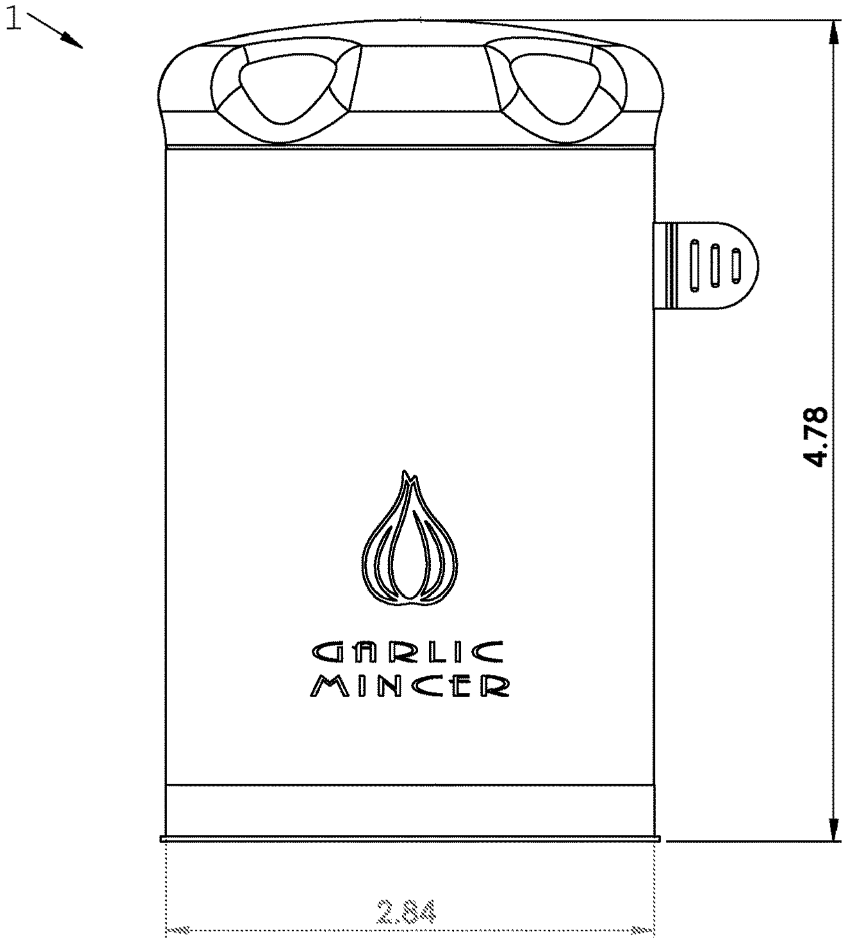
FIG. 3A is front view of the assembled garlic presser/device of FIG. 2.

FIG. 3A is front view of the assembled garlic presser/device 1 of FIG. 2.

FIG. 3B is a top view of the assembled garlic presser/device 1 of FIG. 3A.

Figure 4:
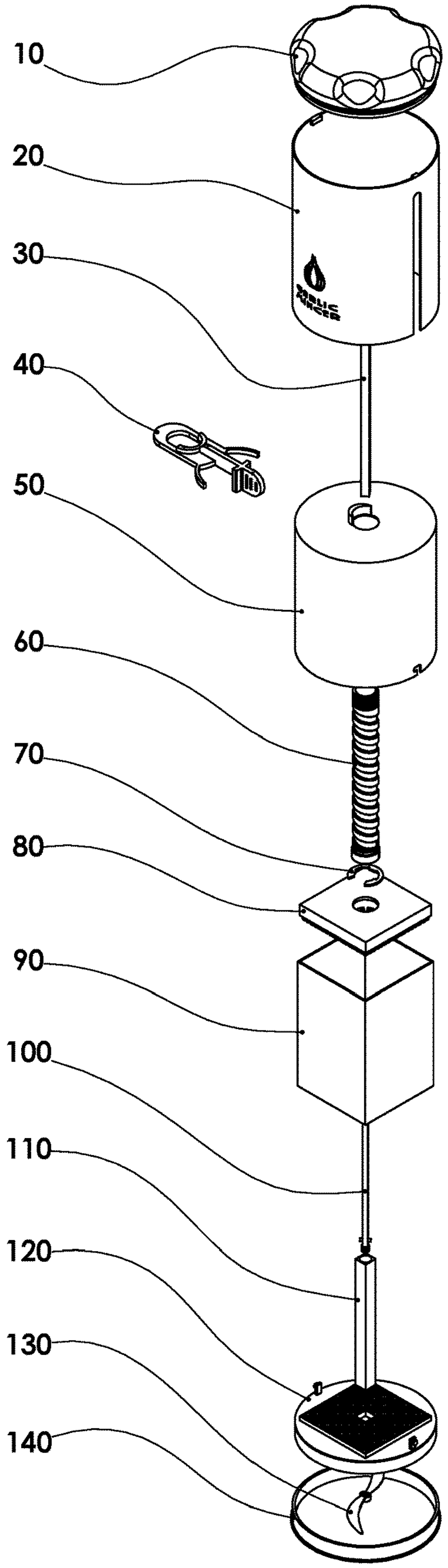
FIG. 4 is an exploded view of the garlic presser/device of the preceding figures.

FIG. 4 is an exploded view of the garlic presser/device 1 of the preceding figures.

Referring to FIGS. 1-4, the garlic presser/device 1 includes a turn knob 10, upper outer housing 20, upper turning blade cover 30, quick release pull tab 40, lower outer housing 50, screw 60, retaining ring 70, plunger 80, inner housing 90, lower blade turning rod 100, external cover tube 110, cutting grid 120, curved cutting blade(s) 130 and bottom cap 140.

The garlic presser/device 1 can have cylindrical dimensions of approximately 2.84 inches and a height of approximately 4.78".

Figure 5:
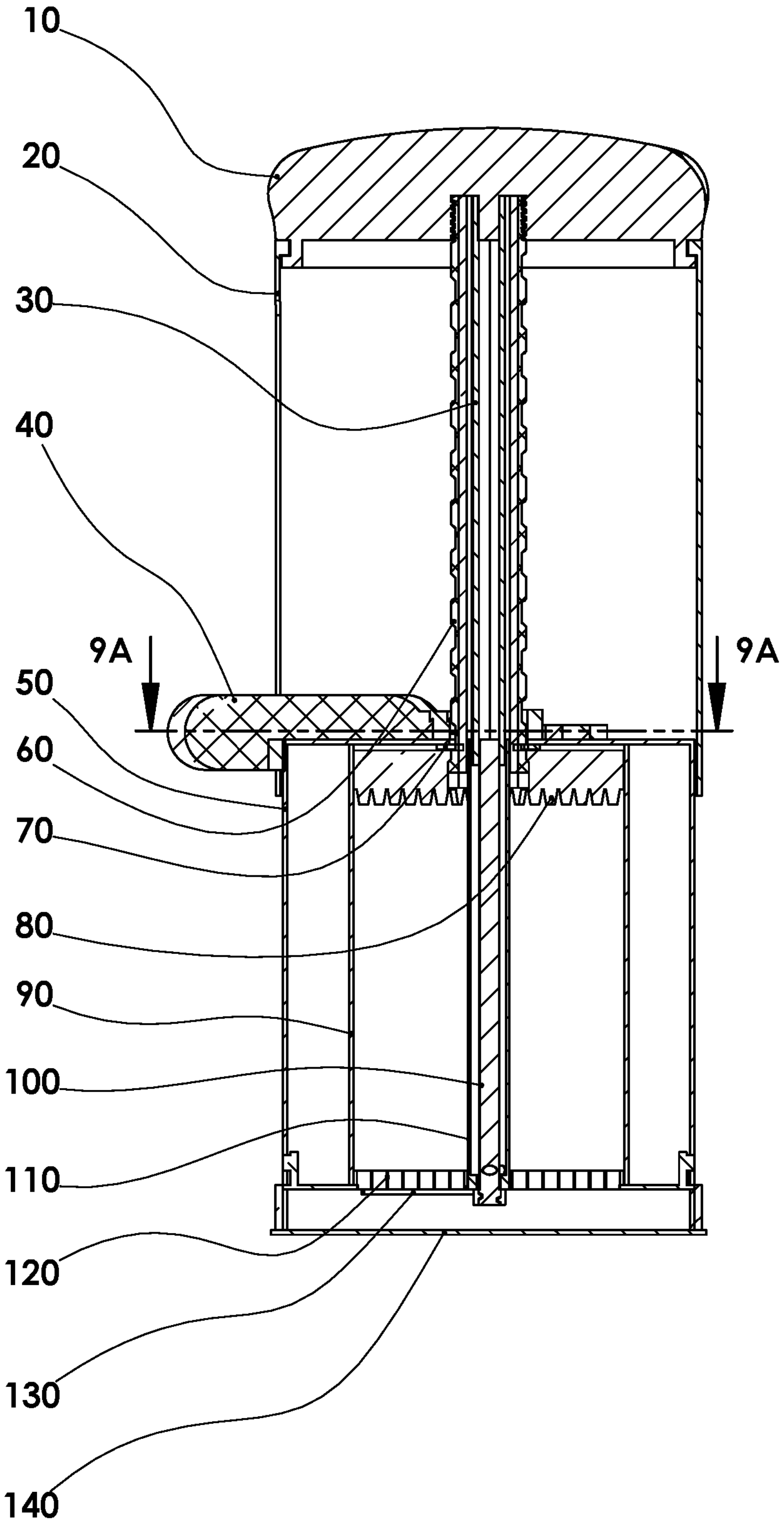
FIG. 5 is a cross-sectional view of the garlic presser/device of FIG. 1.

FIG. 5 is a cross-sectional view of the garlic presser/device 1 of FIG. 1.

Figures 6A, 6B, 6C:
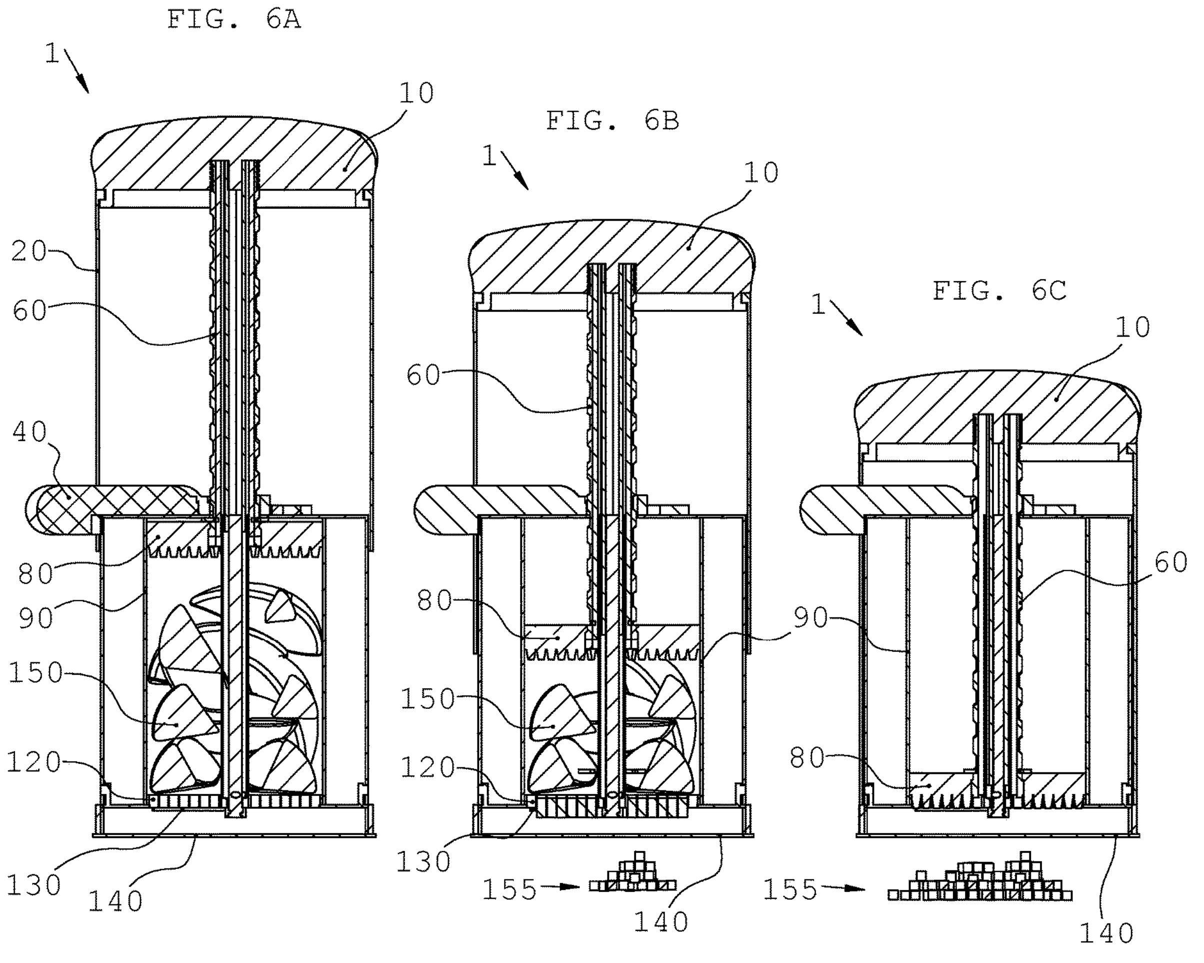
FIG. 6A is another view of FIG. 5 with inner chamber full of garlic cloves, and plunger in up position.
FIG. 6B is another view of FIG. 6A with a knob rotated and plunger half way with garlic pushed through cutting grid and cut off by rotating curved blades.
FIG. 6C is another view of FIGS. 6A-6B with knob fully rotated and plunger in down position and all garlic pushed through cutting grid and cut off by blades.

FIG. 6A is another view of FIG. 5 with inner chamber full of garlic cloves 150, and plunger 80 in up position. FIG. 6A is a cross-sectional view of FIG. 1 along arrows 6A. The inner chamber 90 formed by inner housing 90 is shown full of garlic cloves 150. Turning the knob 10 clockwise will screw the plunger 80 down and turn the blade(s) 130.

FIG. 6B is another view of FIG. 6A with knob 10 further rotated and plunger 80 half way with garlic cloves 150 pushed through cutting grid 120 and cut off by rotating curved blades 130.

FIG. 6C is another view of FIGS. 6A-6B with knob 10 fully rotated and plunger 80 in down position and all garlic pushed through cutting grid 120 and cut off by blades 130. In FIG. 6C, the knob 10 is fully rotated so the plunger 80 is completely pushed down against the cutting grid 120, so the inner chamber of inner housing 90 is completely empty. At this point all garlic has been pushed through the grid 120 and cut up by the rotating blade(s) 130.

In FIGS. 6B and 6C, cut garlic pieces 155 are shown located outside the bottom cap 140. The bottom cap 140 is removed to access the cut garlic pieces 155 to be used by the user.

Figure 7A:
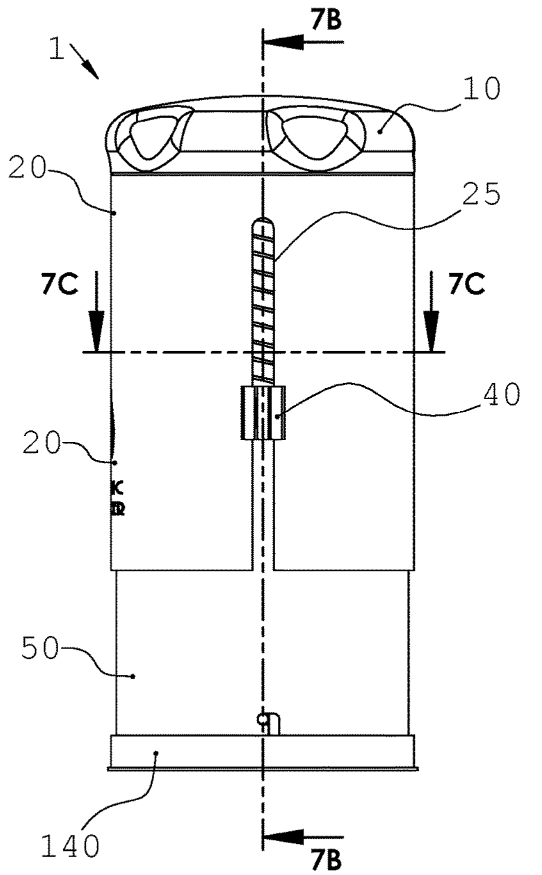
FIG. 7A is a left side view of the garlic presser/device of FIG. 5.

FIG. 7A is a left side view of the garlic presser/device 1 of FIG. 5, and shows the pull tab end 42 of the quick release pull tab 40 extending out from the side slit 25 of the upper outer housing 20. Most of the lower outer housing 50 is exposed.

Figure 7B:
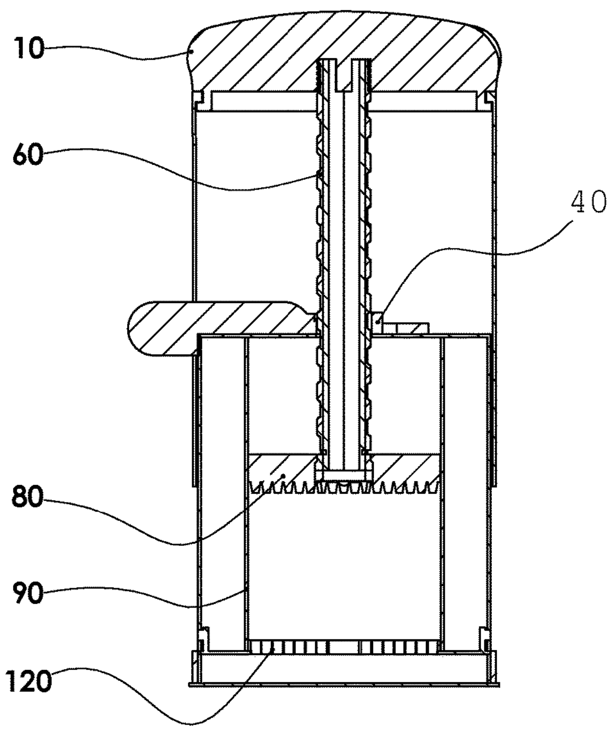
FIG. 7B is a cross-sectional view of FIG. 7A along arrows 7B.

FIG. 7B is a cross-sectional view of FIG. 7A along arrows 7B, and is similar to FIG. 6B. The knob 10 turns the screw 60 which threads through the quick release pull tab 40 and drives the plunger 80 down.

Figure 7C:
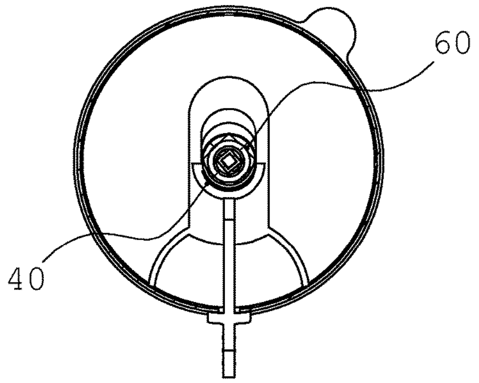
FIG. 7C is a cross-sectional view of FIG. 7A along arrows 7C.

FIG. 7C is a cross-sectional view of FIG. 7A along arrows 7C, and shows the screw 60 threading through the quick release pull tab 40.

Figure 8A:
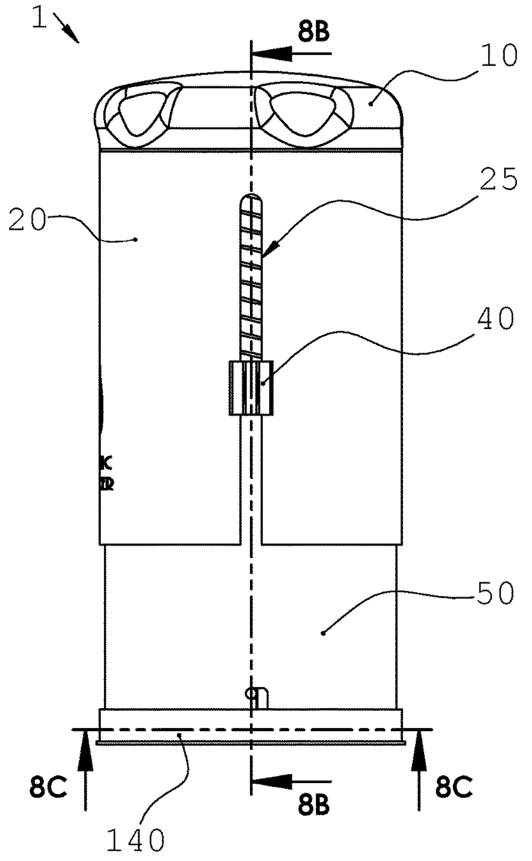
FIG. 8A is another left side view of the garlic presser of FIG. 5.

FIG. 8A is another left side view of the garlic presser/device 1 of FIG. 5, and is similar to FIG. 7A.

Figure 8B:
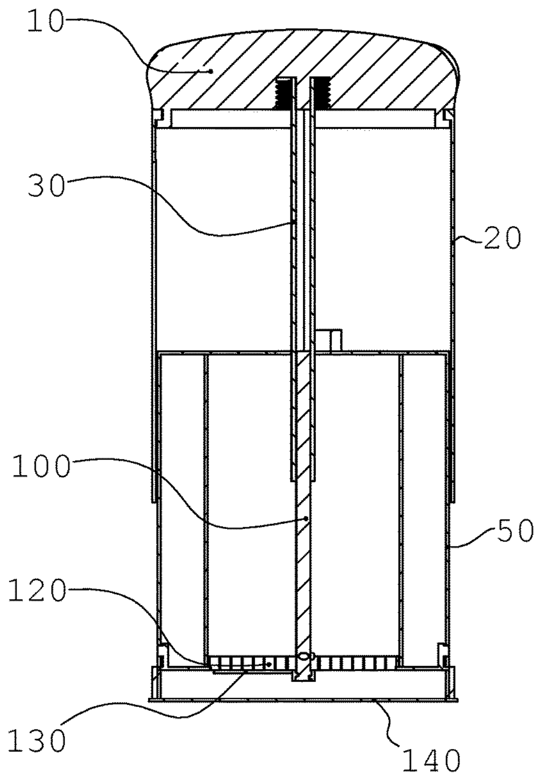
FIG. 8B is a cross-sectional view of the garlic presser of FIG. 8A along arrows 8B.

FIG. 8B is a cross-sectional view of the garlic presser/device 1 of FIG. 8A along arrows 8B, and is similar to FIG. 7B.

Figure 8C:
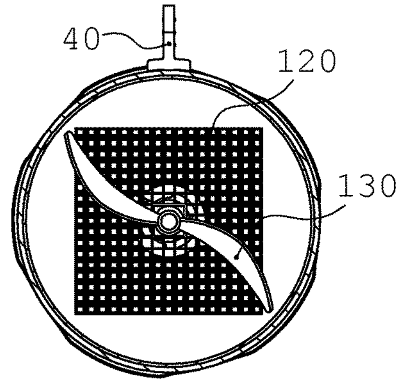
FIG. 8C is a cross-sectional view of the garlic presser/device of FIG. 8A along arrows 8D.

FIG. 8C is a cross-sectional view of the garlic presser of FIG. 8A along arrows 8D. The blade(s) 130 are flush with the cutting grid 120, and can cut the garlic cloves pushed through the grid 130, approximately 3/32" long as it passes through the grid 120.

Each grid of the cutting grid is approximately 3/32"×3/32" and measures approximately 2.0"×2.0" total. The garlic can be cut off at approximately 3/32" lengths.

The cutting grid 130 can have individual grid openings of each being approximately 3/32" wide by approximately 3/32" by approximately 3/32", and being made of stainless steel.

Figure 9A:
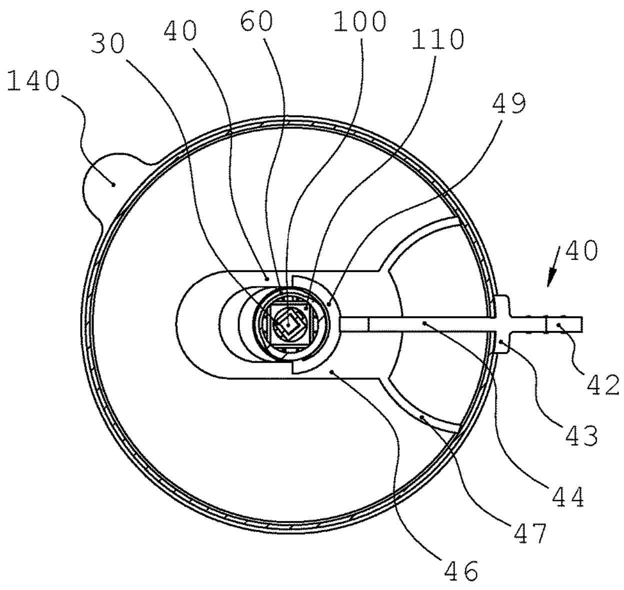
FIG. 9A is a cross-sectional view of the garlic presser/device of FIG. 5 along arrows 9A showing the quick release tab engaged with the screw to driver plunger to mince garlic.

FIG. 9A is a cross-sectional view of the garlic presser/device 1 of FIG. 5 along arrows 9A showing the quick release tab 40 engaged with the screw 60 to driver plunger 80 to mince garlic.

The tab end 42 of quick release pull tab 40 has stop 43 against upper outer housing 20. Elongated leg is connected to base member 46 which has spring members pushing raised arc ridge 49 against screw 60. The quick release tab 40 is further shown and described in FIGS. 13A-13F.

Figure 9B:
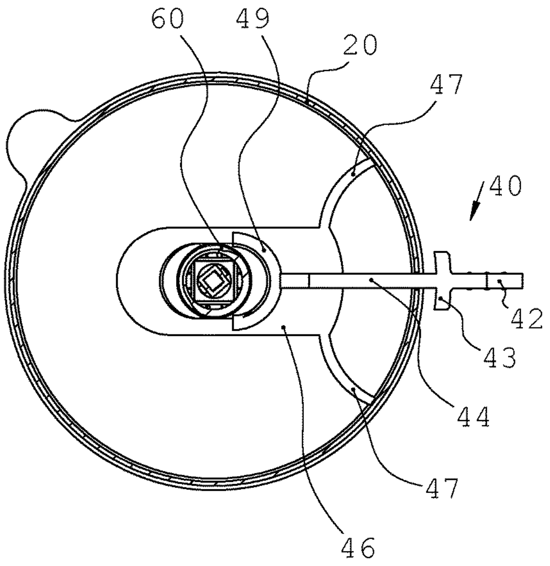
FIG. 9B is another view of FIG. 9A with quick release tab pulled to disengage screw to allow user to quickly disassemble the garlic presser/device for loading and cleaning.

FIG. 9B is another view of FIG. 9A with quick release tab 40 pulled back in the direction of arrow P to disengage screw 60 to allow user to quickly disassemble the garlic presser/device 1 for loading and cleaning.

In FIG. 9B tab end 42 is pulled back in the direction of arrow P, pulling stop 43 away from upper outer housing 20, and compresses spring member 47. Base member with raised arc ridge moves in the direction of arrow P to disengage from screw 60.

Tab end 42 is pulled back in the direction of arrow P, and compresses spring member 47. Base member pulls stop 49 with raised arc ridge away from screw 60, moving in the direction of arrow P to disengage from screw 60 allowing screw 60 to move freely up or down.

The user can then raise up the turn knob 10 to take the garlic presser/device 1 apart for cleaning and reloading the device 1.

Referring to FIGS. 4, 6C and 9A-9B, when the screw 60 has pushed the plunger 80 to the bottom of the inner housing 80 and has completed the downward travel and has pushed all the garlic out of the inner housing, the user pulls the tab end 42 of the quick release pull tab 40 to disengage the screw 60 and allow the plunger 80 and screw 60 to freely travel to the upper position to start the process over.

Figure 10B:
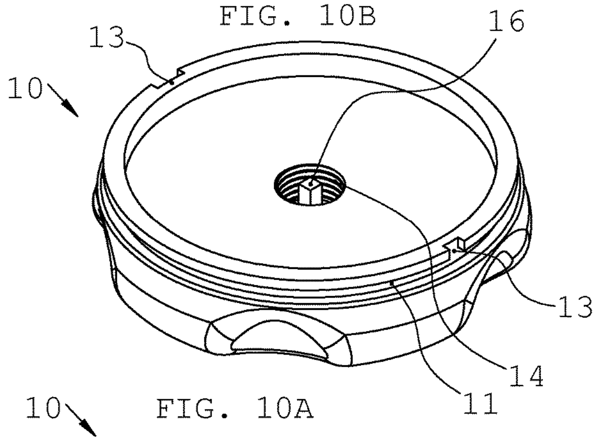
FIG. 10B is a lower perspective view of the turn knob of FIG. 10A.
Figure 10C:
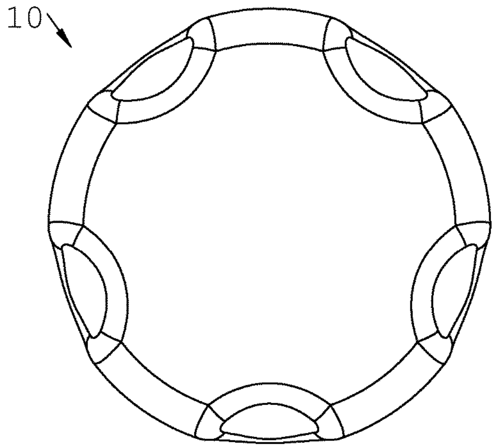
FIG. 10C is a top view of the turn knob of FIG. 10A.
Figure 10A:
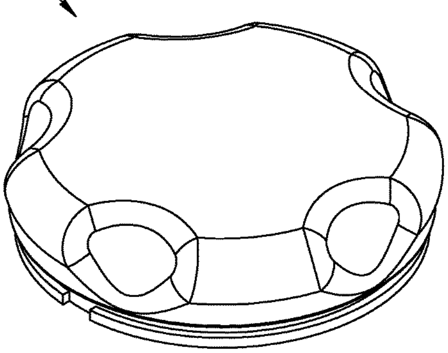
FIG. 10A is an upper perspective view of the turn knob in the garlic presser/device in the preceding figures.
Figure 10E:
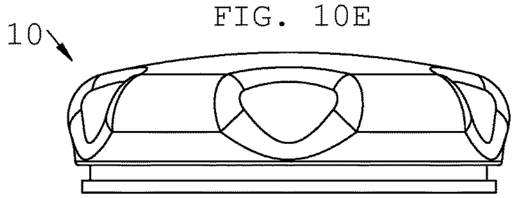
FIG. 10E is a front view of the turn knob of FIG. 10A.
Figure 10F:
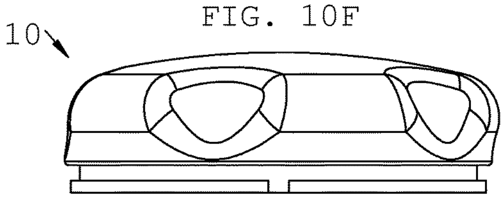
FIG. 10F is a rear view of the turn knob of FIG. 10A.
Figure 10D:
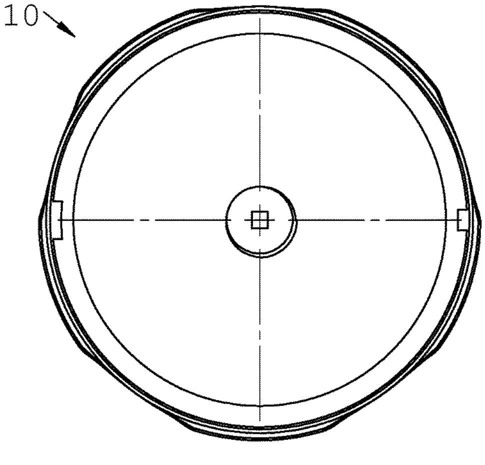
FIG. 10D is a bottom view of the turn knob of FIG. 10A.

FIG. 10A is an upper perspective view of the turn knob 10 in the garlic presser/device 1 in the preceding figures. FIG. 10B is a lower perspective view of the turn knob 10 of FIG. 10A. FIG. 10C is a top view of the turn knob 10 of FIG. 10A. FIG. 10D is a bottom view of the turn knob 1—of FIG. 10A. FIG. 10E is a front view of the turn knob 10 of FIG. 10A. FIG. 10F is a rear view of the turn knob 10 of FIG. 10A.

On a rear side of turn knob 10 can be a generally cylindrical stem portion 11 with one external thread to allow upper outer housing 20 to turn freely. A narrow groove 12 and opposite facing wide groove 13 allow upper outer housing 20 to attach to turn knob 10 and prevent the upper outer housing 20 from separating from the turn knob 10.

Referring to FIGS. 4 and 10A-10F, the turn knob 10, can be formed from molded plastic with peripheral indentations about a dome portion for easy gripping surface. On a rear side of turn knob 10 can be a generally cylindrical stem portion 11 with external threads with a narrow groove 12 and opposite facing wide groove 12.

In the middle of the rear side of turn knob 20 is a central cavity 14 with internal threads, and a post with rectangular/square head 16 protruding therefrom.

The rectangular/square head of the post 16 can be used with the upper turning blade cover 30 described in relation to FIGS. 12A-12E below.

Figure 11A:
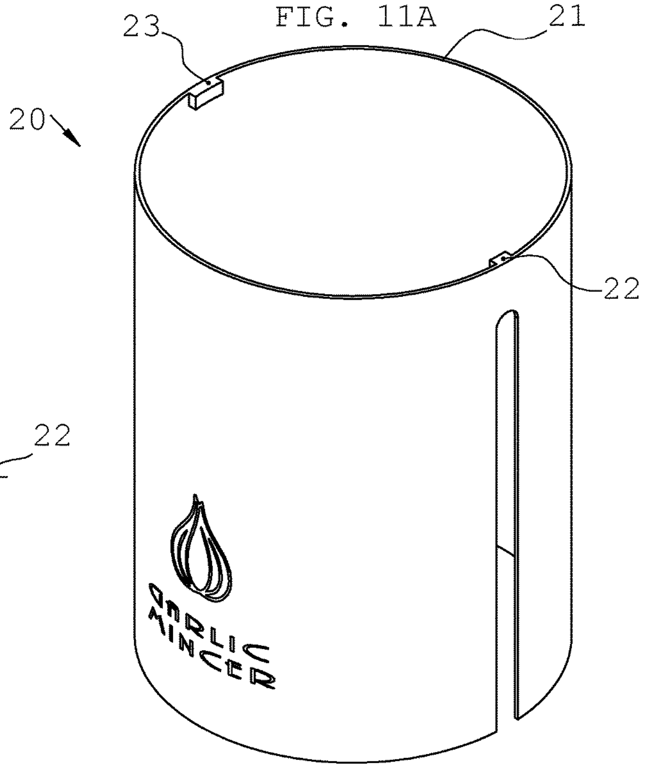
FIG. 11A is an upper front perspective view of the outer housing used in the garlic presser of the preceding figures.
Figure 11D:
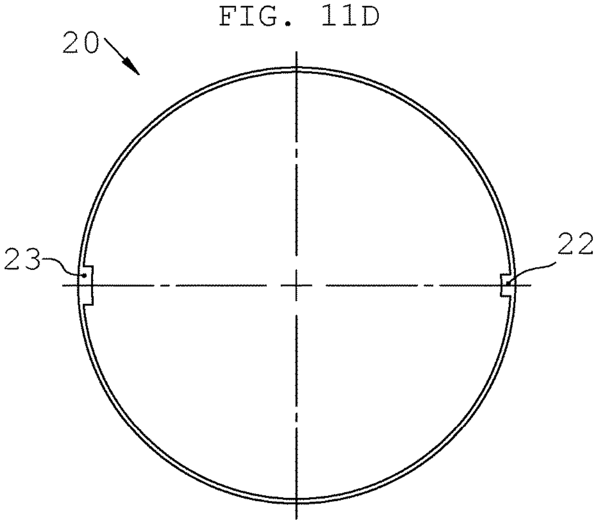
FIG. 11D is a top view of the outer housing of FIG. 11A.
Figure 11B:
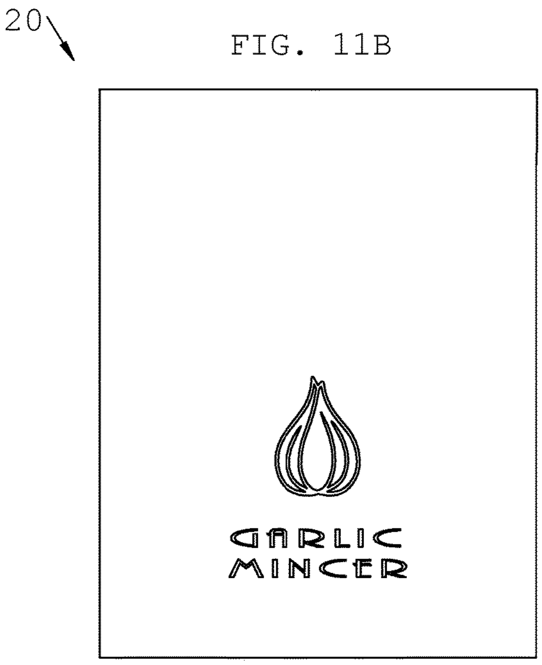
FIG. 11B is a front view of the outer housing of FIG. 11A.
Figure 11C:
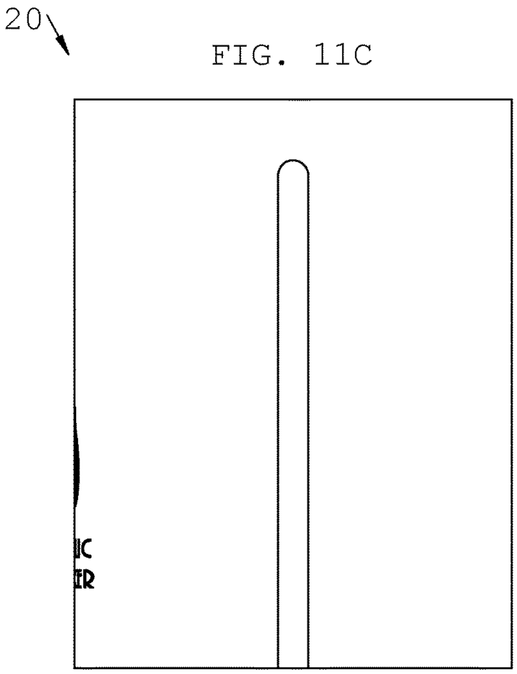
FIG. 11C is a side view of the outer housing of FIG. 11A.

FIG. 11A is an upper front perspective view of the upper outer housing 20 used in the garlic presser of the preceding figures. FIG. 11B is a front view of the upper outer housing 20 of FIG. 11A. FIG. 11C is a side view of the upper outer housing 20 of FIG. 11A. FIG. 11D is a top view of the upper outer housing of FIG. 11A.

Referring to FIGS. 4 and 11A-11D, the upper outer housing 20 can have a cylindrical hollow shape with an approximately 2.1" diameter and approximately 5" high. The upper end 21 can have opposite facing opposing inwardly facing wide protrusion 23 and inwardly facing narrow protrusion 22. . . . the upper outer housing 20 can have a cylindrical hollow shape with approximately 2.84" diameter and approximately 4" high.

Referring to FIGS. 4, 10B, 11A and 11D, inwardly facing narrow and wide protrusions 22 and 23 of upper outer housing 20 can fit within narrow groove 12 and wide groove 13, respectively of turn knob 10, while the turn knob 10 is being rotated relative to the upper outer cylinder 20.

Figure 12D:
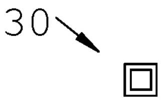
FIG. 12D is a top view of the upper turning blade cover of FIG. 12A.
Figure 12A:
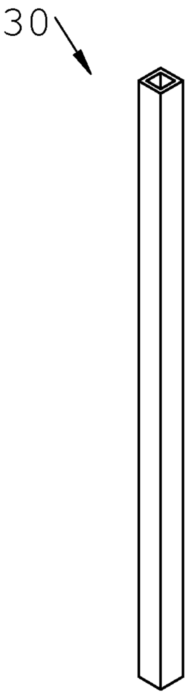
FIG. 12A is an upper front perspective view of the upper turning blade cover used in the garlic presser/device of the preceding figures, and in FIG. 4.
Figure 12B:
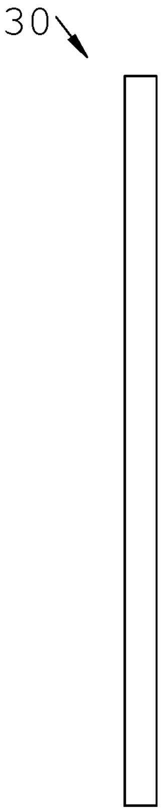
FIG. 12B is a front view of the upper turning blade cover of FIG. 12A.

FIG. 12A is an upper front perspective view of the upper turning blade cover 30 used in the garlic presser/device 1 of the preceding figures, and in FIG. 4. FIG. 12B is a front view of the upper turning blade cover 30 of FIG. 12A.

Figure 12C:
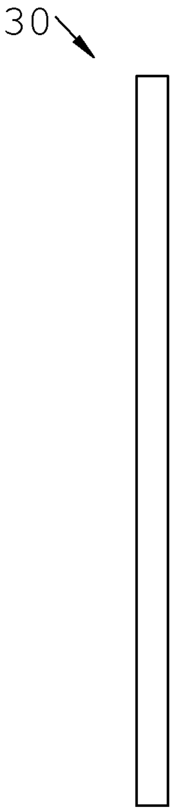
FIG. 12C is a rear view of the upper turning blade cover of FIG. 12A.

FIG. 12C is a rear view of the upper turning blade cover 30 of FIG. 12A.

FIG. 12D is a top view of the upper turning blade cover 30 of FIG. 12A.

Figure 12E:
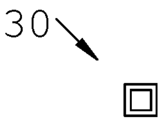
FIG. 12E is a bottom view of the upper turning blade cover of FIG. 12A.

FIG. 12E is a bottom view of the upper turning blade cover 30 of FIG. 12A.

Referring to FIGS. 4 and 12A-12E, upper turning blade cover 30 has a generally square cross-sectional exterior shape that telescopes within hollow screw 60 shown and described in reference to FIGS. 15A-15F.

Upper turning blade cover 30 has generally square cross-sectional interior shape with upper generally square shape hollow end, which mateably connects to the rectangular/square head protruding downward from the central post 16 on the lower surface of turn knob 10(shown and described previously in relation to FIG. 10B.

Upper turning blade cover 30 holds the lower blade turning rod 100 internally and allows lower blade turning rod 100 to telescope vertically inside upper turning blade cover 30 as the screw 60 is moving vertically. The upper turning blade cover 30 is made of stainless steel.

Figure 13A:
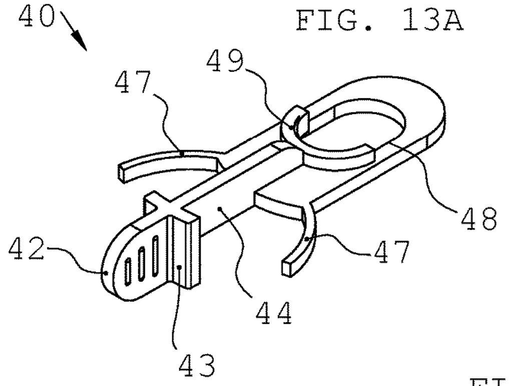
FIG. 13A is an upper front perspective view of the quick release tab used in the garlic presser/device of the preceding figures, and in FIG. 4.

FIG. 13A is an upper front perspective view of the quick release tab 40 used in the garlic presser/device 1 of the preceding figures, and in FIG. 4. FIG. 13B is an upper rear perspective view of the quick release tab 40 of FIG. 13A.

Figure 13C:
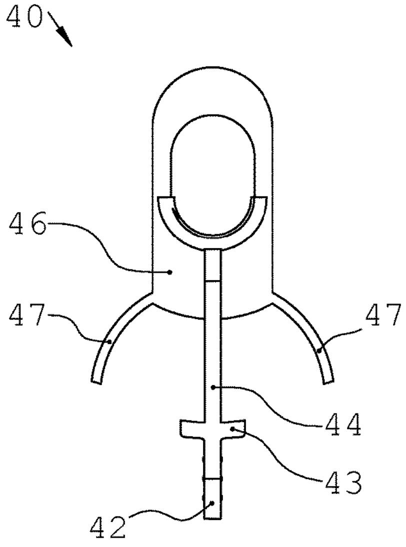
FIG. 13C is a top view of the quick release tab of FIG. 13A.
Figure 13B:
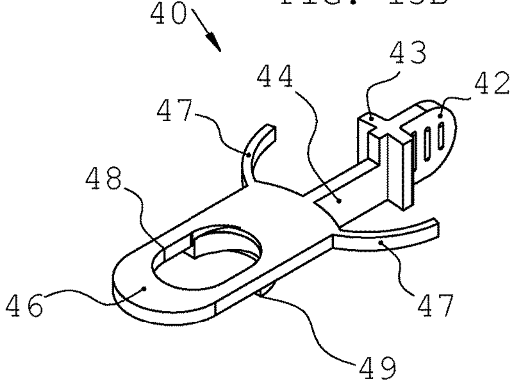
FIG. 13B is an upper rear perspective view of the quick release tab of FIG. 13A.
Figure 13E:
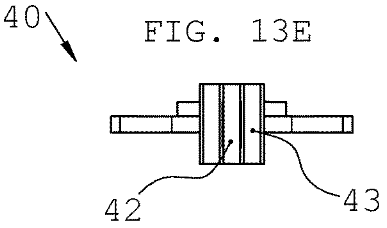
FIG. 13E is a front view of the quick release tab of FIG. 13A.
Figure 13F:
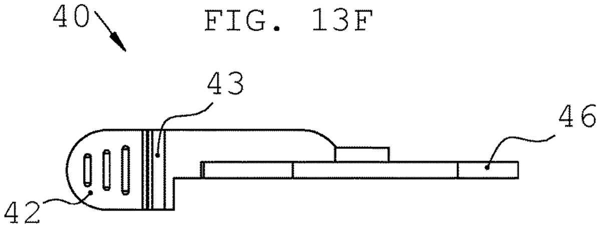
FIG. 13F is a right side view of the quick release tab of FIG. 13A.
Figure 13D:
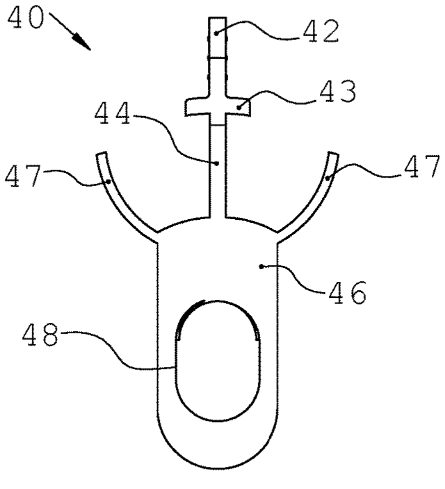
FIG. 13D is a bottom view of the quick release tab of FIG. 13A.

FIG. 13C is a top view of the quick release tab 40 of FIG. 13A. FIG. 13D is a bottom view of the quick release tab 40 of FIG. 13A. FIG. 13E is a front view of the quick release tab 40 of FIG. 13A. FIG. 13F is a right side view of the quick release tab 40 of FIG. 13A.

Referring to FIGS. 4 and 13A-13F, quick release tab 40 can include tab end 42, stop 43, elongated leg 44, and base member 46 with spring members/legs 47, and oval opening 48, with raised arc ridge 49.

The quick release tab can be made of molded polycarbonate plastic. The oval opening 48, with raised arc ridge 49, engages the tread of the screw 60.

Figure 14D:
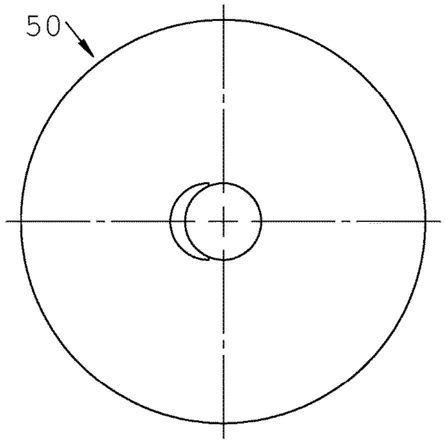
FIG. 14D is a top view of the lower outer housing of FIG. 14A.
Figure 14A:
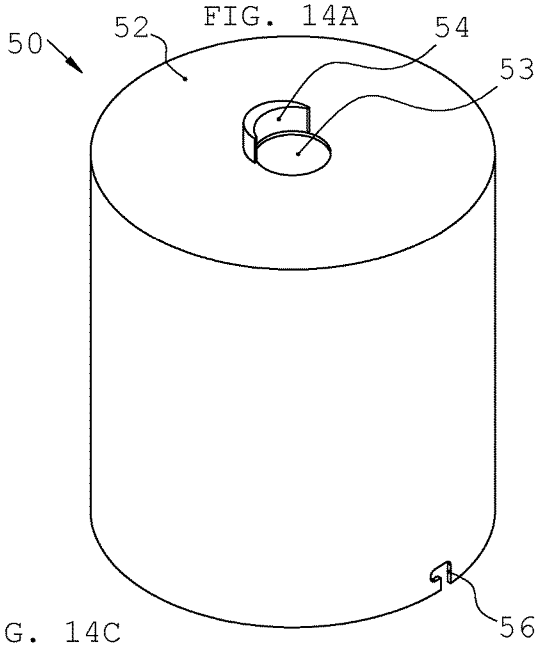
FIG. 14A is an upper front perspective view of the lower outer housing used in the garlic presser of the preceding figures, and in FIG. 4.
Figure 14B:
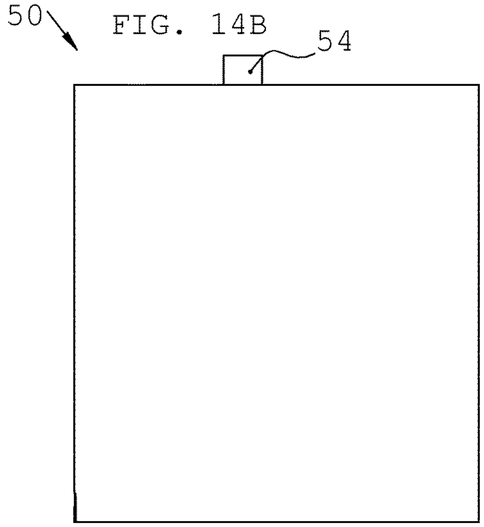
FIG. 14B is a front view of the lower outer housing of FIG. 14A.
Figure 14C:
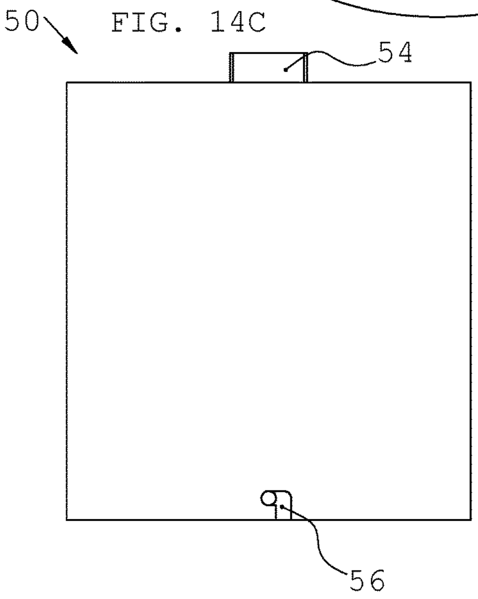
FIG. 14C is a right side view of the lower outer housing of FIG. 14A.
Figure 14E:
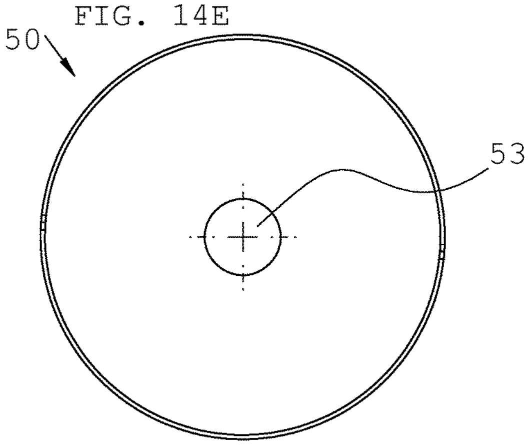
FIG. 14E is a bottom view of the lower outer housing of FIG. 14A.

FIG. 14A is an upper front perspective view of the lower outer housing 50 used in the garlic presser/device 1 of the preceding figures, and in FIG. 4. FIG. 14B is a front view of the lower outer housing 50 of FIG. 14A. FIG. 14C is a right side view of the lower outer housing 50 of FIG. 14A. FIG. 14D is a top view of the lower outer housing 50 of FIG. 14A. FIG. 14E is a bottom view of the lower outer housing 50 of FIG. 14A.

Referring to FIGS. 4 and 14A-14E, lower outer housing 50 can have a generally cylindrical configuration with an outer diameter of approximately 2" by approximately 5.0" high, and can be formed from stainless steel.

Lower outer housing 50 can have a generally flat top lid 52, with a central opening through-hole 53, and an upwardly extending raised arc ridge 54.

The inside of lower outer housing 50 can be hollow to allow for inner housing 90 (shown and described in FIGS. 18A-18E) to be able to slide inside.

Along the lower side edges of the lower outer housing 50 can be opposite facing L-shaped grooves 56. The opposite facing L-shaped grooves 56 can be used to allow bottom cap 140 to be attached thereto, as referenced and described in FIGS. 23A-23F below.

Figure 15B:
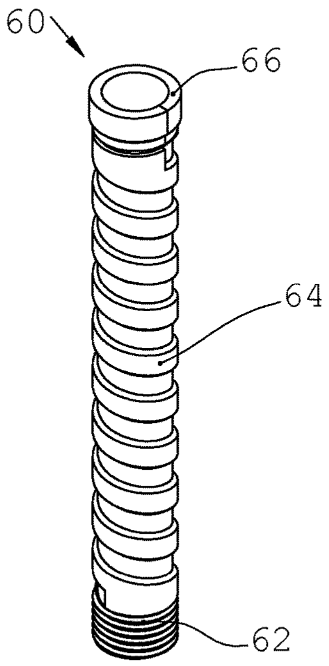
FIG. 15B is a lower front perspective view of the screw of FIG. 15A.
Figure 15E:
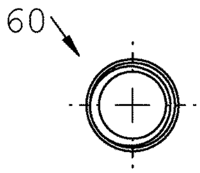
FIG. 15E is a top view of the screw of FIG. 15A.
Figure 15A:
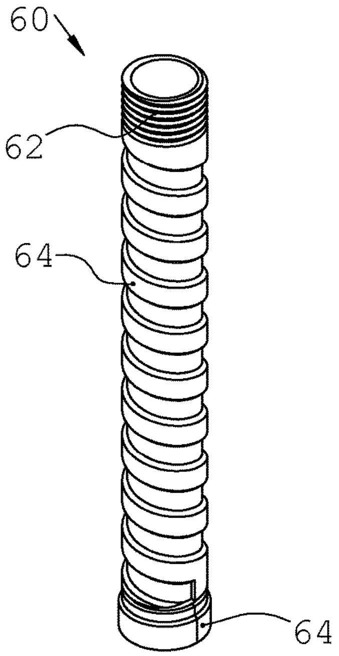
FIG. 15A is an upper front perspective view of the screw used in the garlic presser/device of the preceding figures, and in FIG. 4.
Figure 15C:
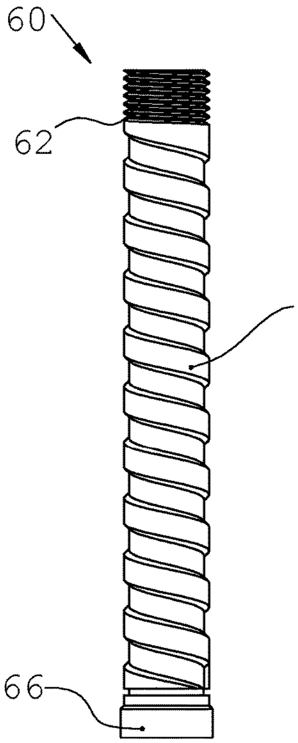
FIG. 15C is a front view of the screw of FIG. 15A.
Figure 15D:
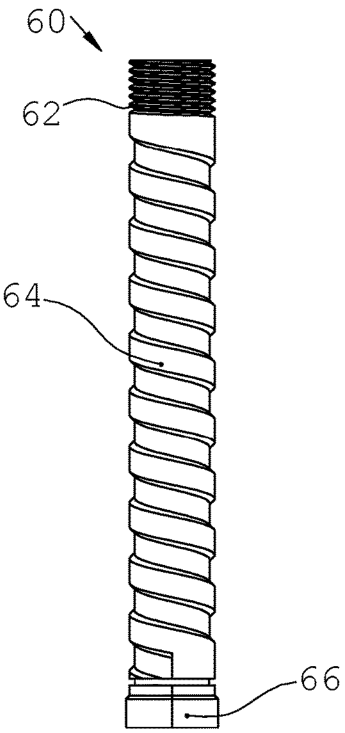
FIG. 15D is a right side view of the screw of FIG. 15A.
Figure 15F:
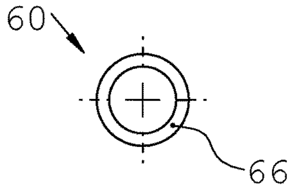
FIG. 15F is a bottom view of the screw of FIG. 15A.

FIG. 15A is an upper front perspective view of the screw 60 used in the garlic presser/device 1 of the preceding figures, and in FIG. 4. FIG. 15B is a lower front perspective view of the screw 60 of FIG. 15A. FIG. 15C is a front view of the screw 60 of FIG. 15A. FIG. 15D is a right side view of the screw 60 of FIG. 15A. FIG. 15E is a top view of the screw 60 of FIG. 15A. FIG. 15F is a bottom view of the screw 60 of FIG. 15A.

Referring to FIGS. 4 and 15A-15F, screw 60 is hollow and includes an upper external threaded end 62, a large threaded side 64, and a bottom cap 66 with a central opening therethrough. Screw 60 can be machined in stainless steel.

The upper external threaded end 62 of screw 60 screwably attached to the internal threads in central cavity 14 under turn knob 10, which was previously described in reference to FIGS. 10A-10E.

Figure 16B:
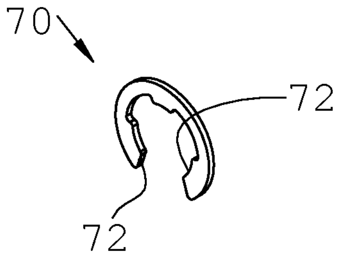
FIG. 16B is lower front view of the retaining ring of FIG. 16A.
Figure 16E:
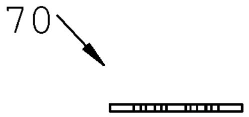
FIG. 16E is a top view of the retaining ring of FIG. 16A.
Figure 16A:
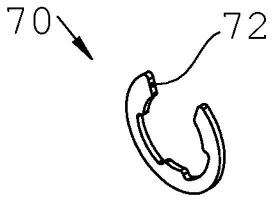
FIG. 16A is an upper front perspective view of the retaining ring used in the garlic presser/device of the preceding figures, and in FIG. 4.
Figure 16C:
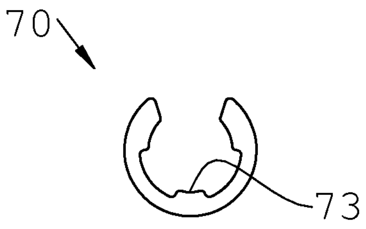
FIG. 16C is a front view of the retaining ring of FIG. 16A.
Figure 16D:
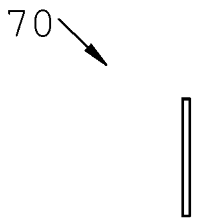
FIG. 16D is a right side view of the retaining ring of FIG. 16A.
Figure 16F:
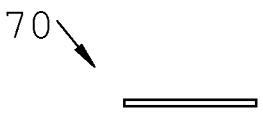
FIG. 16F is a bottom view of the retaining ring of FIG. 16A.

FIG. 16A is an upper front perspective view of the retaining ring 70 used in the garlic presser/device 1 of the preceding figures, and in FIG. 4. FIG. 16B is lower front view of the retaining ring 70 of FIG. 16A. FIG. 16C is a front view of the retaining ring 70 of FIG. 16A. FIG. 16D is a right side view of the retaining ring 70 of FIG. 16A. FIG. 16E is a top view of the retaining ring 70 of FIG. 16A. FIG. 16F is a bottom view of the retaining ring 70 of FIG. 16A.

Referring to FIGS. 4 and 16A-16F, the retaining ring 70 has a generally ring shape with a circular side, and side opening 72, and three internal protruding edges 73. Retaining ring 70 is used prevent lower blade turning rod 100 from sliding out of inner housing 90.

The retaining ring 70 can be made of a stamped metal and is used to attach screw 60 to top of plunger 80.

Figure 17B:
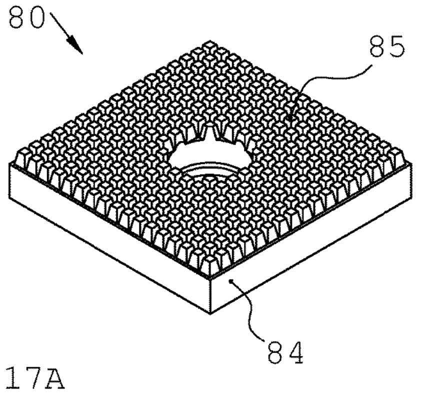
FIG. 17B is a lower front perspective view of the plunger of FIG. 17A.
Figure 17F:
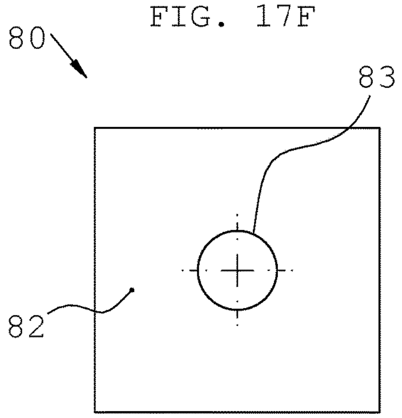
FIG. 17F is a top view of the plunger of FIG. 17A.
Figure 17A:
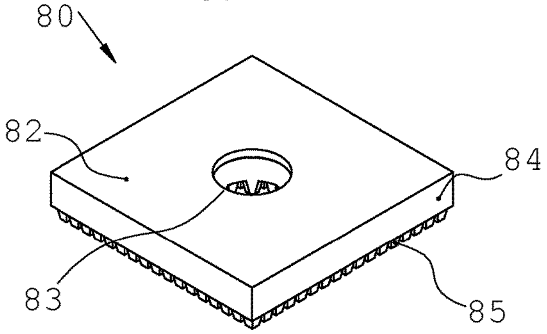
FIG. 17A is an upper front perspective view of the plunger used in the garlic presser/device of the preceding figures, and in FIG. 4.
Figure 17C:
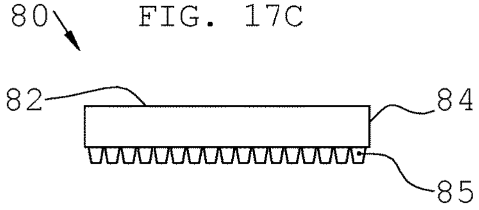
FIG. 17C is a front view of the plunger of FIG. 17A.
Figure 17D:
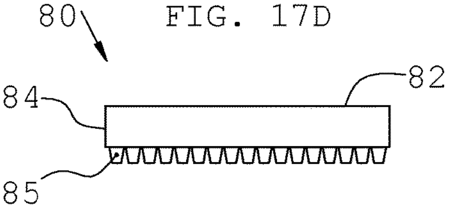
FIG. 17D is a right side view of the plunger of FIG. 17A.
Figure 17E:
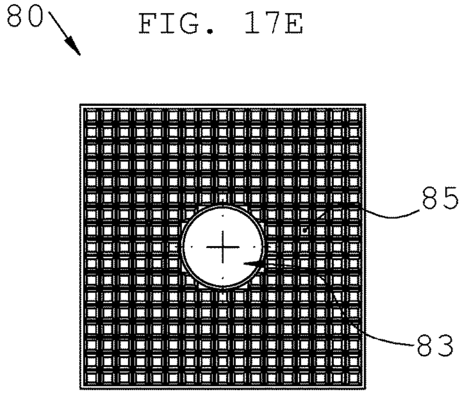
FIG. 17E is a bottom view of the plunger of FIG. 17A.

FIG. 17A is an upper front perspective view of the plunger 80 used in the garlic presser/device 1 of the preceding figures, and in FIG. 4. FIG. 17B is a lower front perspective view of the plunger 80 of FIG. 17A. FIG. 17C is a front view of the plunger 80 of FIG. 17A. FIG. 17D is a right side view of the plunger 80 of FIG. 17A. FIG. 17E is a bottom view of the plunger 80 of FIG. 17A. FIG. 17F is a top view of the plunger 80 of FIG. 17A.

Referring to FIGS. 4 and 17A-17F, plunger 80 can have a generally rectangular shape with a flat top 82, with central opening 83 therethrough, and rectangular flat side walls 84 and bottom facing teeth 85.

Plunger 80 is sized to slide up and down within inner housing 90. Plunger 80 is attached to screw 60 with flange 66 in FIG. 15 and retaining ring 70.

The plunger 80 including teeth can be made as one part in a die cast metal. The shape of the teeth are made to fit inside the cutting grid 120. Plunger 80 is attached to screw 60 with flange 66 in FIG. 15 and retaining ring 70.

The screw 60 referenced in FIGS. 15A-15E pushes the plunger 80 downward.

The plunger 80 is used to crush, push and clean the garlic cloves 150 through the grid 120 shown in FIGS. 6A-6C.

Figure 18A:
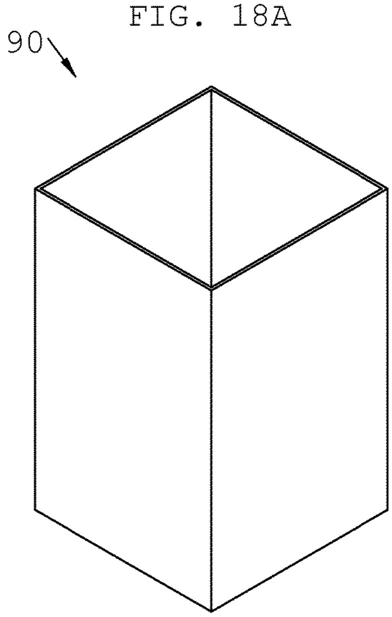
FIG. 18A is an upper front view of the inner housing used in the garlic presser of the preceding figures, and in FIG. 4.
Figure 18D:
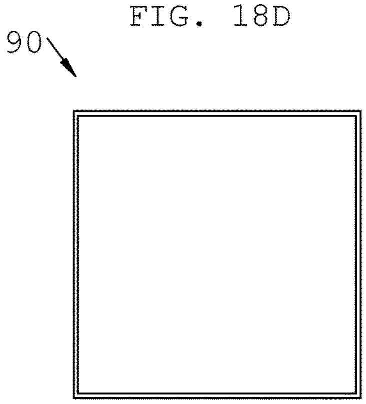
FIG. 18D is a top view of the inner housing of FIG. 18A.
Figure 18B:
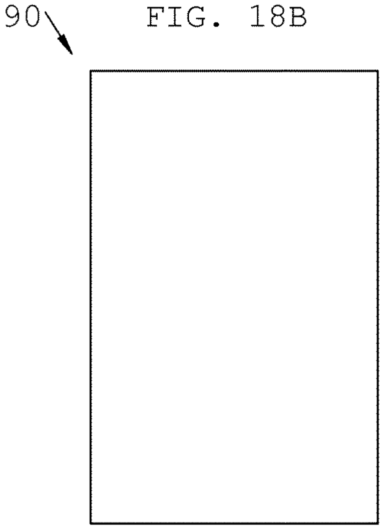
FIG. 18B is a front view of the inner housing of FIG. 18A.
Figure 18C:
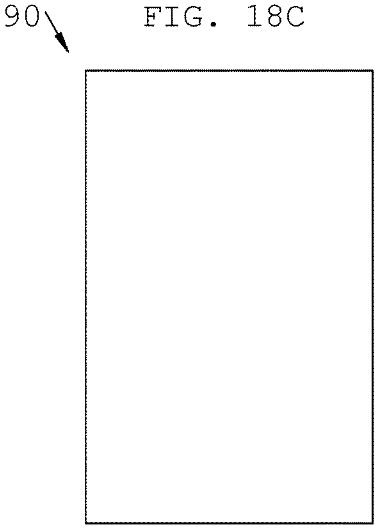
FIG. 18C is a right side view of the inner housing of FIG. 18A.
Figure 18E:
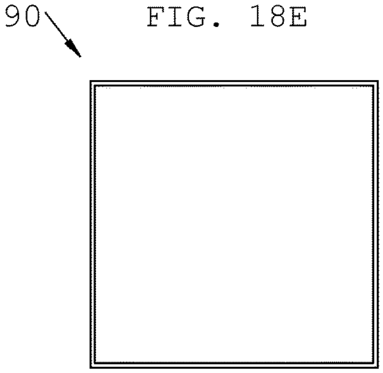
FIG. 18E is a bottom view of the inner housing of FIG. 18A.

FIG. 18A is an upper front view of the inner housing 90 used in the garlic presser/device 1 of the preceding figures, and in FIG. 4. FIG. 18B is a front view of the inner housing 90 of FIG. 18A. FIG. 18C is a right side view of the inner housing 90 of FIG. 18A. FIG. 18D is a top view of the inner housing 90 of FIG. 18A. FIG. 18E is a bottom view of the inner housing 90 of FIG. 18A.

Referring to FIGS. 18A-18E, inner housing 90 has a generally rectangular cross-sectional shape with a hollow interior sized to allow plunger 80 to slide up and down within. Inner housing 90 can have outer dimensions of approximately 2.0"×approximately 2.0" and can be approximately 4.0" high and made of stainless steel.

Figure 19B:
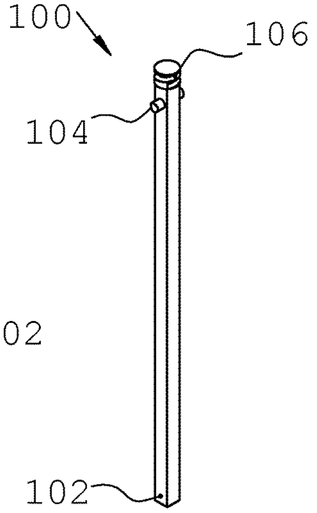
FIG. 19B is a lower front perspective view of the lower blade turning rod of FIG. 19A.
Figure 19A:
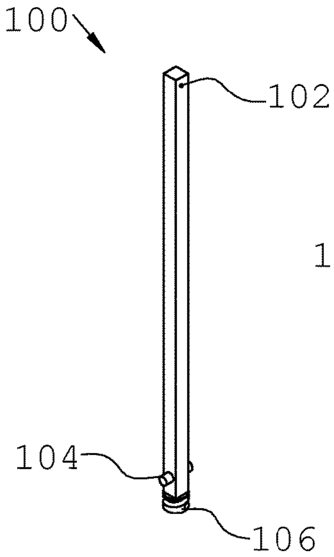
FIG. 19A is an upper front perspective view of the lower blade turning rod used in the garlic presser/device of the preceding figures, and in FIG. 4.
Figure 19E:
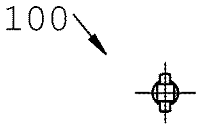
FIG. 19E is a top view of the lower blade turning rod of FIG. 19B
Figure 19C:
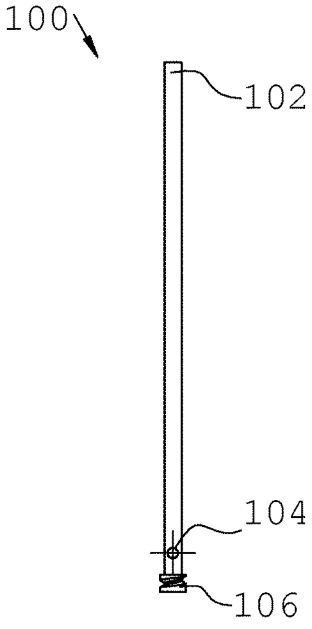
FIG. 19C is a front view of the lower blade turning rod of FIG. 19A.
Figure 19D:
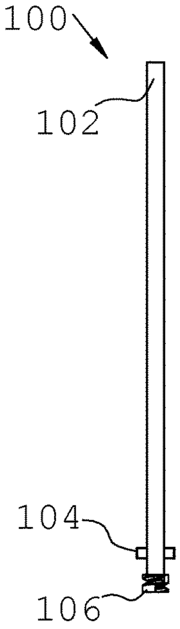
FIG. 19D is a right side view of the lower blade turning rod of FIG. 19A.
Figure 19F:
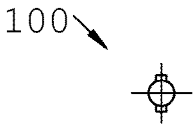
FIG. 19F is a bottom view of the lower blade turning rod of FIG. 19A.

FIG. 19A is an upper front perspective view of the lower blade turning rod 100 used in the garlic presser/device 1 of the preceding figures, and in FIG. 4. FIG. 19B is a lower front perspective view of the lower blade turning rod 100 of FIG. 19A. FIG. 19C is a front view of the lower blade turning rod 100 of FIG. 19A. FIG. 19D is a right side view of the lower blade turning rod 100 of FIG. 19A. FIG. 19E is a top view of the lower blade turning rod 100 of FIG. 19B. FIG. 19F is a bottom view of the lower blade turning rod 100 of FIG. 19A.

Referring to FIGS. 4 and 19A-19F, lower blade turning rod 100 has a generally square shape and telescopes inside of screw 60 shown and described in FIGS. 15A-15F. Lower turning rod 100 includes a top end 102, and bottom opposite facing pegs 104 and a bottom end 106.

The pegs 104 can be used to prevent lower blade turning rod 100 from sliding though cutting grid 120. The bottom end screw 104 attaches the lower blade turning rod 100 to the curved cutting blade 130.

Figure 20B:
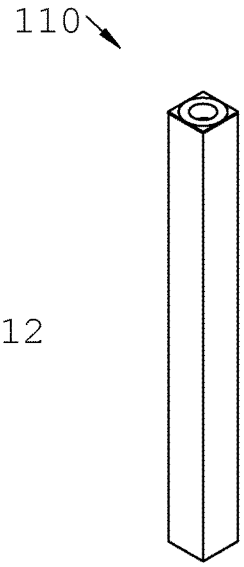
FIG. 20B is a lower front perspective view of the external covering tube of FIG. 20A.
Figure 20A:
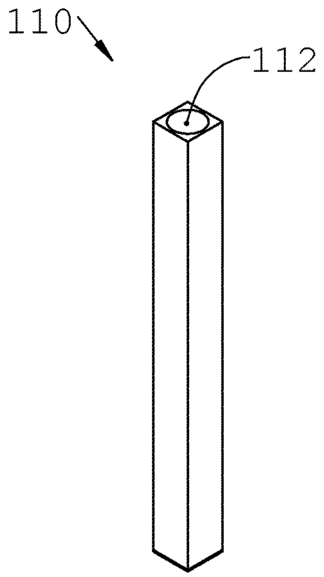
FIG. 20A is an upper front perspective view of the external covering tube used in the garlic presser of the preceding figures, and in FIG. 4.
Figure 20E:
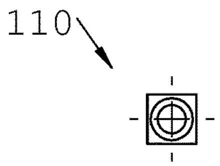
FIG. 20E is a top view of the external covering tube of FIG. 20A.
Figure 20C:
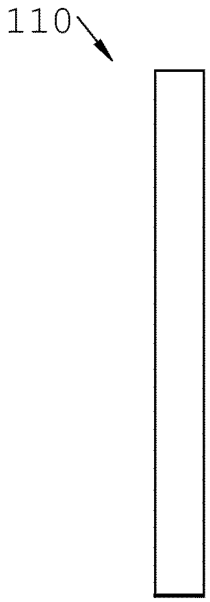
FIG. 20C is a front view of the external covering tube of FIG. 20A.
Figure 20D:
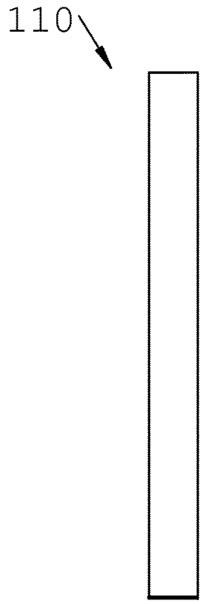
FIG. 20D is a right side view of the external covering tube of FIG. 20A.
Figure 20F:
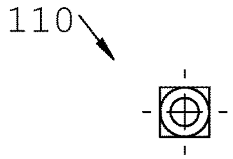
FIG. 20F is a bottom view of the external covering tube of FIG. 20A.

FIG. 20A is an upper front perspective view of the external covering tube 110 used in the garlic presser/device 1 of the preceding figures, and in FIG. 4. FIG. 20B is a lower front perspective view of the external covering tube 110 of FIG. 20A. FIG. 20C is a front view of the external covering tube 110 of FIG. 20A. FIG. 20D is a right side view of the external covering tube of FIG. 20A. FIG. 20E is a top view of the external covering tube 110 of FIG. 20A. FIG. 20F is a bottom view of the external covering tube 110 of FIG. 20A.

The external covering tube 110 can be stationary and protects garlic cloves from being damaged while lower blade turning rod 110 is turning.

Referring to FIGS. 4 and 20A-20F, the external covering tube 110 can have an elongated square cross-sectional shape and include an elongated cylindrical chamber 112 from the top to the bottom, which allows for the lower blade turning rod 100 to rotate inside.

The external cover tube 110 can be an extruded metal tube and can be welded or stamped to the cutting grid 120. The cutting grid 120 and external cover tube is held in place by attachment to outer housing 50.

Figure 21B:
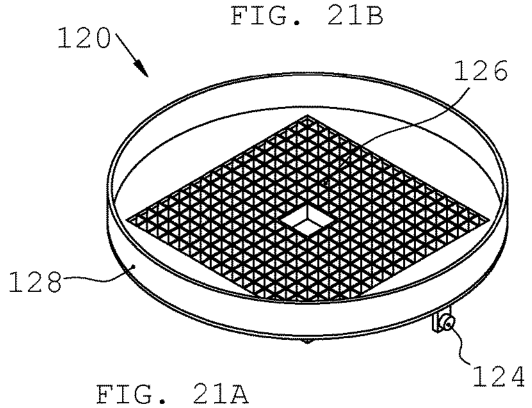
FIG. 21B is a lower perspective view of the cutting grid of FIG. 21A.
Figure 21E:
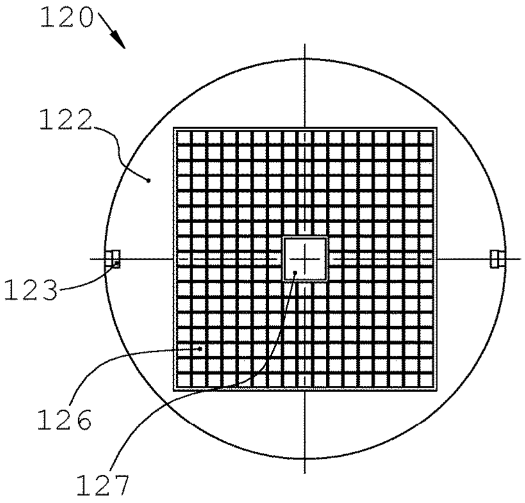
FIG. 21E is a top view of the cutting grid of FIG. 21A.
Figure 21A:
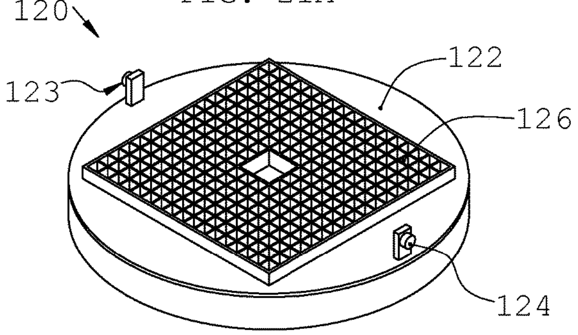
FIG. 21A is an upper perspective view of the cutting grid used in the garlic presser/device of the preceding figures, and in FIG. 4.
Figure 21C:
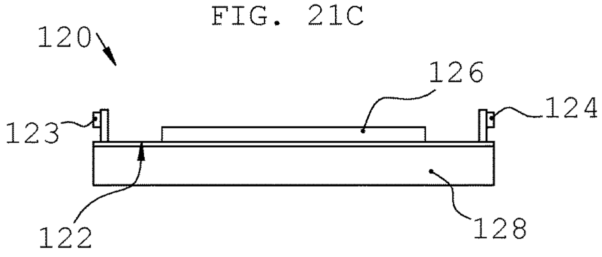
FIG. 21C is a front view of the cutting grid of FIG. 21A.
Figure 21D:
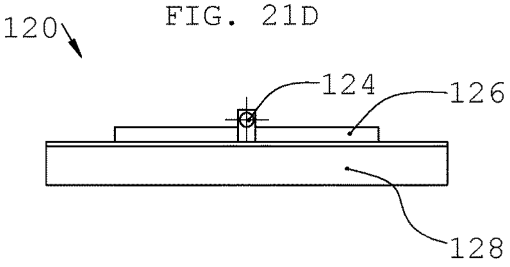
FIG. 21D is a right side view of the cutting grid of FIG. 21A.
Figure 21F:
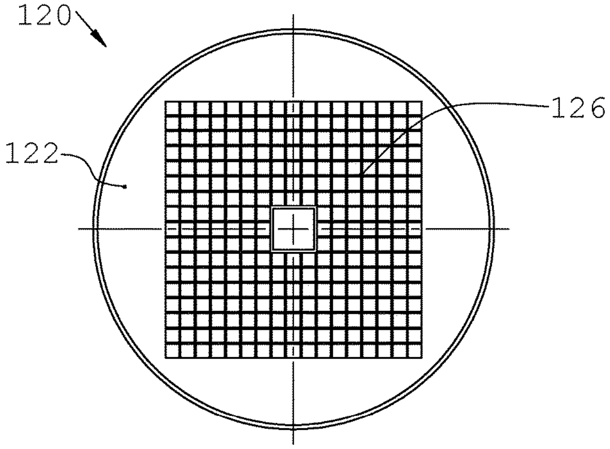
FIG. 21F is a bottom view of the cutting grid of FIG. 21A.

FIG. 21A is an upper perspective view of the cutting grid 120 used in the garlic presser of the preceding figures, and in FIG. 4. FIG. 21B is a lower perspective view of the cutting grid 120 of FIG. 21A. FIG. 21C is a front view of the cutting grid 120 of FIG. 21A. FIG. 21D is a right side view of the cutting grid 120 of FIG. 21A. FIG. 21E is a top view of the cutting grid 120 of FIG. 21A. FIG. 21F is a bottom view of the cutting grid of FIG. 21A.

Referring to FIGS. 4, 6A-6C and 21A-21F, as the knob 100 is turned, the attached screw 60 pushes the plunger 80 down and forces the garlic cloves 150 in the inner housing 90 to go through the cutting grid 120.

Referring to FIGS. 4 and 21A-21F, cutting grid 120 can include a disc shaped base 122 with a left edge raised prong connector 123 and right edge raised prong connector 123. Mounted in the middle of the disc shaped base 122 can be rectangular grid 126 having individual rectangular grids each being approximately 1.5" by approximately 1.5", with a height of approximately 5" high. A center square shaped through-hole 127 can be through the middle of the grid 126 for allowing the bottom of the external cover tube 110 to pass therethrough. Along the sides of the base 122 can be a downwardly shaped cylindrical sidewall. 128. The cutting grid 120 can be formed from stainless steel. having rectangular grids each being approximately 2.0"×2.0" total with a height of approximately 0.5" high. Left and right prong connectors attach and lock to outer housing 50.

Figure 22B:
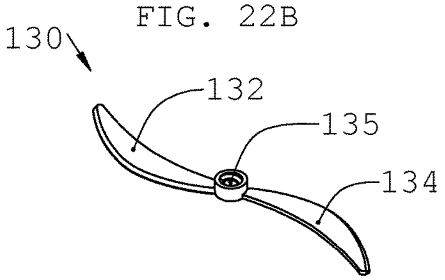
FIG. 22B is a lower perspective view of the curved cutting blade of FIG. 22A.
Figure 22D:
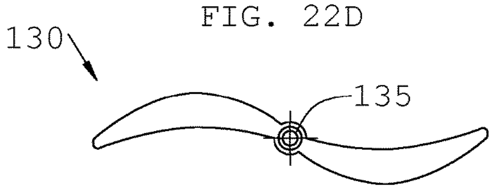
FIG. 22D is a top view of the curved cutting blade of FIG. 22A.
Figure 22A:
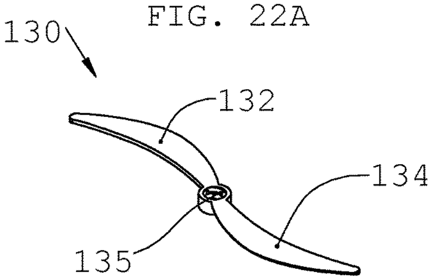
FIG. 22A is an upper perspective view of the curved cutting blade used in the garlic presser/device of the preceding figures, and in FIG. 4.
Figure 22C:
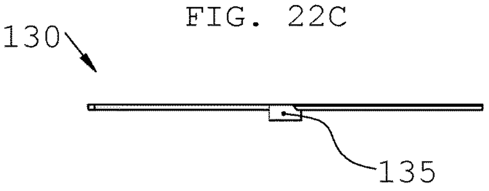
FIG. 22C is a front view of the curved cutting blade of FIG. 22A.
Figure 22F:
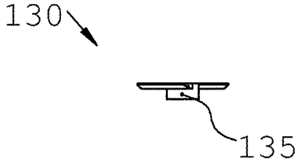
FIG. 22F is a right side view of the curved cutting blade of FIG. 22A.
Figure 22E:
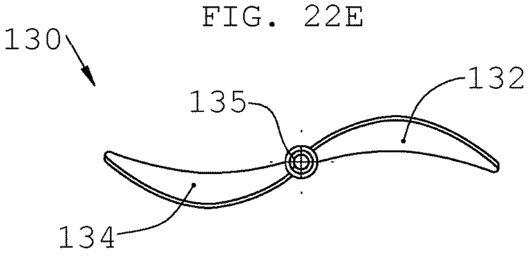
FIG. 22E is a bottom view of the curved cutting blade of FIG. 22A.

FIG. 22A is an upper perspective view of the curved cutting blade 130 used in the garlic presser/device 1 of the preceding figures, and in FIG. 4. FIG. 22B is a lower perspective view of the curved cutting blade 130 of FIG. 22A. FIG. 22C is a front view of the curved cutting blade 130 of FIG. 22A. FIG. 22D is a top view of the curved cutting blade 130 of FIG. 22A. FIG. 22E is a bottom view of the curved cutting blade 130 of FIG. 22A. FIG. 22F is a right side view of the curved cutting blade 130 of FIG. 22A.

Referring to FIGS. 4 and 22A-22F, the curved cutting blade 130 can include a left curved wing blade 132, right curved wing blade, and center hub 135 having a through-hole. The curved cutting blade 130 can be formed from stainless steel.

The screw bottom 106 on FIG. 19A on lower blade turning rod 100 screws into thread 135 on curved cutting blade 130(FIGS. 22A and 22B) and attaches the two components.

Referring to FIGS. 4, 6B, 6C and 22A-22, as the knob 10 is turned, a upper turning blade cover 30 and telescoping lower blade turning rod 100 turns the curved cutting blade 130. As the garlic comes through the cutting grid 120, the curved cutting blade 130 minces the garlic into small cubes.

Figure 23B:
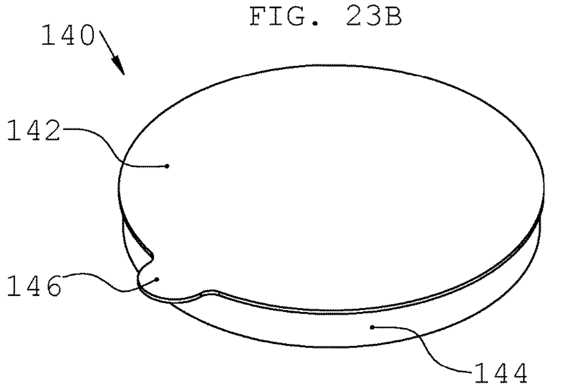
FIG. 23B is a bottom perspective view of the bottom cap of FIG. 23A.
Figure 23C:
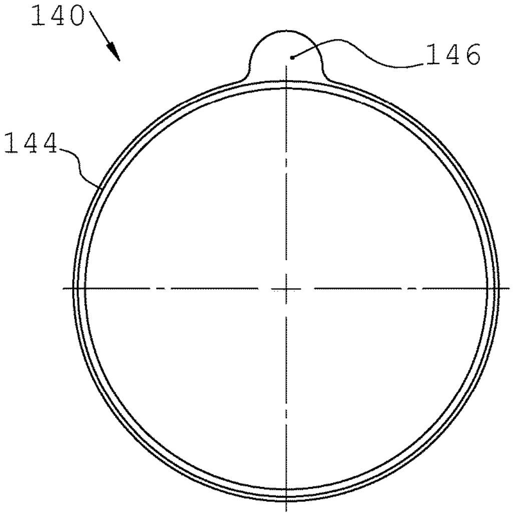
FIG. 23C is a top view of the bottom cap of FIG. 23A.
Figure 23A:
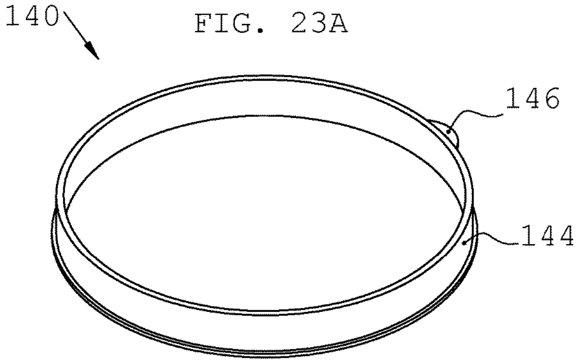
FIG. 23A is an upper front perspective view of the bottom cap used in the garlic presser/device of the preceding figures, and in FIG. 4.
Figure 23E:
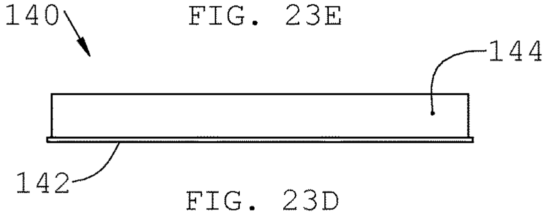
FIG. 23E is a front view of the bottom cap of FIG. 23A.
Figure 23F:
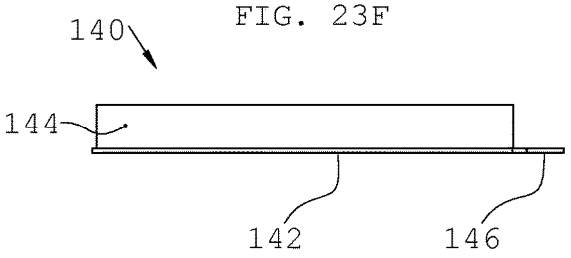
FIG. 23F is a right side view of the bottom cap of FIG. 23A.
Figure 23D:
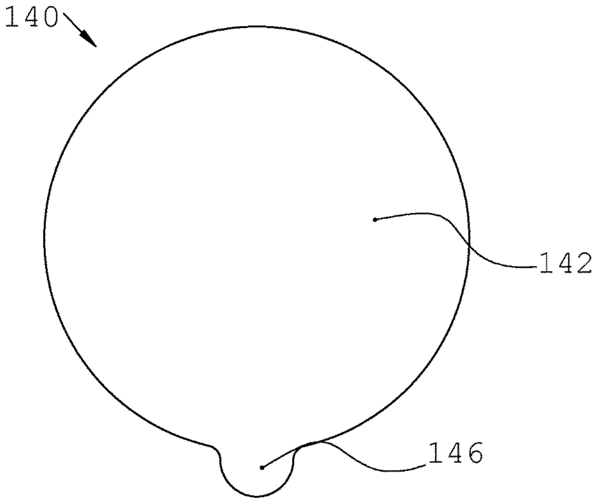
FIG. 23D is bottom view of the bottom cap of FIG. 23A.

FIG. 23A is an upper front perspective view of the bottom cap 140 used in the garlic presser/device 1 of the preceding figures, and in FIG. 4. FIG. 23B is a bottom perspective view of the bottom cap 140 of FIG. 23A. FIG. 23C is a top view of the bottom cap 140 of FIG. 23A. FIG. 23D is bottom view of the bottom cap 140 of FIG. 23A. FIG. 23E is a front view of the bottom cap 140 of FIG. 23A. FIG. 23F is a right side view of the bottom cap 140 of FIG. 23A.

The bottom cap 140 is used to prevent excess garlic from spilling out of the cutting grid 120.

Referring to FIGS. 4 and 23A-23F, the bottom cap 140 can include a flat disc top 142, downward cylindrical sidewall 144 and a pull tab 146. Bottom cap 140 can be made from stainless steel.

Sidewall 144 attaches to sidewall 128 cutting grid 120 with a friction fit. Pull tab 146 is used to remove bottom cap 140.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The term "approximately" is similar to the term "about" and can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A garlic mincing device, comprising:
- a cylinder assembly having an open upper end and a bottom end with a cutting grid, and a chamber therebetween for storing garlic cloves;
- a screw assembly having an upper end and a bottom end;
- a plunger attached to the bottom end of the screw assembly; the plunger placed over the stored garlic cloves;
  - a rotating blade attached to the bottom end of the screw assembly positioned below the cutting grid; and
  - a turn knob attached to the upper end of the screw assembly, wherein rotating the knob rotates the screw assembly to push the plunger down and pushes the cloves through a cutting grid into resultant garlic pieces, followed by slicing the resultant garlic pieces into sliced cube pieces with the rotating blade.

2. The garlic mincing device of claim 1, further comprising:
- a quick release tab attached to the device to be used when the plunger has pushed all the garlic cloves through the cutting grid, to disengage the screw assembly and allow the plunger and the screw assembly to be removed for new amounts of garlic cloves be inserted into the chamber.

3. The garlic mincing device of claim 2, wherein the quick release tab includes:
- a tab end that extends sideways from the cylinder assembly, the tab end attached to an elongated member; and
- an inner end attached to an opposite end of the elongated member, wherein pulling the tab end outward away from the cylinder assembly allows the plunger and the screw assembly to be removed, from the device.

4. The garlic mincing device of claim 1, further comprising:
- a removable cap attached to the bottom end of the cylinder assembly for holding the sliced cube pieces of garlic.

5. The mincing device of claim 4, wherein the removable cap includes:
- a separate pull tab, wherein pulling the tab allows the removable cap to be released from the device.

6. The garlic mincing device of claim 1, wherein the cutting grid includes:
- rectangular openings.

7. The garlic mincing device of claim 1, wherein the rectangular openings in the cutting grid are each approximately 3/32" wide, by approximately 3/32" high.

8. The garlic mincing device of claim 1, wherein the cylinder assembly, the plunger, the cutting grid and the rotating blade are formed from stainless steel.

9. The garlic mincing device of claim 1, wherein the cylinder assembly includes:
- an outer cylindrical housing;
- an inner cylindrical housing within the outer cylindrical housing; and
- an inner rectangular housing within the inner cylindrical housing, wherein the inner rectangular housing allows for the plunger to slide up and down.

10. The garlic mincing device of claim 1, wherein the screw assembly includes:
- an outer cylinder having an external thread surface; and
- a turning blade rod positioned inside the outer cylinder.

11. The garlic mincing device of claim 10, further comprising:
- an upper turning blade cover for protecting an upper portion of the turning blade rod; and
- an external cover tube for protecting a lower portion of the turning blade rod.

12. The garlic mincing device of claim 1, wherein the plunger includes downwardly extending teeth.

13. The garlic mincing device of claim 1, wherein the rotating blade includes:
- two curved blades attached to a central hub made from stainless steel.

14. The garlic mincing device of claim 1, wherein the knob is formed from molded plastic and includes upper gripping edge.

15. The garlic mincing device of claim 1, wherein the device includes a height of approximately 4.78, and a diameter of approximately 2.84".

16. A method of mincing garlic cloves, comprising the steps of:
- providing a cylinder assembly having an open upper end and a bottom end with a cutting grid, and chamber between the upper end and the cutting grid, storing garlic cloves in the chamber;
  - providing a screw assembly having an upper end and a bottom end, inside of the cylinder assembly;
  - attaching a plunger to the bottom end of the screw assembly, above the stored garlic cloves;
  - attaching a rotating blade to the bottom end of the screw assembly positioned below the cutting grid; and
  - providing a turn knob attached to the upper end of the screw assembly; and
  - rotating the knob which rotates the screw assembly to push the plunger down to push the cloves through the cutting grid into resultant garlic pieces, which are sliced into sliced cube pieces by the rotating blade.

17. The method of claim 16, further comprising the steps of:

providing quick release tab attached to the cylinder assembly; and pulling the quick release tab when the plunger has pushed all the garlic cloves through the cutting grid, to disengage the screw assembly and allow the plunger and the screw assembly to feely travel so that the knob, the screw assembly and the plunger are removable so new amounts of garlic cloves be inserted into the chamber.

18. The method of claim 16, further comprising the step of:

attaching a removable cap attached to the bottom end of the cylinder assembly for holding the sliced cube pieces of garlic.

19. The method of claim 16, wherein the step of providing the cylinder assembly includes the steps of:

providing an outer cylindrical housing;

providing an inner cylindrical housing within the outer cylindrical housing; and providing an inner rectangular housing within the inner cylindrical housing, wherein the inner rectangular housing allows for the plunger to slide up and down.

20. The method of claim 16, further comprising the step of:

providing the plunger with downwardly extending teeth.

* * * * *